(12) United States Patent
Saito et al.

(10) Patent No.: US 9,509,015 B2
(45) Date of Patent: Nov. 29, 2016

(54) BATTERY

(75) Inventors: Shunsuke Saito, Fukushima (JP);
Masayuki Ihara, Fukushima (JP);
Atsumichi Kawashima, Fukushima (JP); Takehiko Tanaka, Fukushima (JP); Tadahiko Kubota, Kanagawa (JP)

(73) Assignee: Sony Corporation, Tokyo (JP)

(*) Notice: Subject to any disclaimer, the term of this patent is extended or adjusted under 35 U.S.C. 154(b) by 466 days.

(21) Appl. No.: 12/708,227

(22) Filed: Feb. 18, 2010

(65) Prior Publication Data

US 2010/0216017 A1 Aug. 26, 2010

Related U.S. Application Data

(63) Continuation-in-part of application No. 12/141,565, filed on Jun. 18, 2008.

(30) Foreign Application Priority Data

Jul. 9, 2007 (JP) ................................ P2007-179385

(51) Int. Cl.
| | |
|---|---|
| H01M 6/04 | (2006.01) |
| H01M 10/0525 | (2010.01) |
| H01M 4/587 | (2010.01) |
| H01M 10/0567 | (2010.01) |
| H01M 10/0568 | (2010.01) |
| H01M 10/0569 | (2010.01) |
| H01M 4/02 | (2006.01) |

(52) U.S. Cl.
CPC ......... *H01M 10/0525* (2013.01); *H01M 4/587* (2013.01); *H01M 10/0567* (2013.01); *H01M 10/0568* (2013.01); *H01M 10/0569* (2013.01); *H01M 2004/021* (2013.01); *H01M 2300/0025* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,616,309 A * | 4/1997 | Zachau-Christiansen | C01G 49/009 423/594.17 |
| 2004/0043300 A1 * | 3/2004 | Utsugi et al. | 429/329 |
| 2006/0068291 A1 * | 3/2006 | Herzel et al. | 429/231.4 |
| 2006/0115735 A1 * | 6/2006 | Yasuda et al. | 429/233 |
| 2006/0228626 A1 | 10/2006 | Kawashima et al. | |

(Continued)

FOREIGN PATENT DOCUMENTS

| | | | |
|---|---|---|---|
| JP | 2000003724 A | * | 1/2000 |
| JP | 2001-110405 | | 4/2001 |
| JP | 2002-008718 | | 1/2002 |

(Continued)

OTHER PUBLICATIONS

Korean Office Action issued Nov. 27, 2014, for corresponding Korean Appln. No. 20080063538.

*Primary Examiner* — Daniel Gatewood
(74) *Attorney, Agent, or Firm* — K&L Gates LLP

(57) ABSTRACT

A battery capable of improving the cycle characteristics even if the thickness of an anode active material layer is increased is provided. The battery includes a cathode, an anode and an electrolytic solution. The anode has an anode active material layer on an anode current collector, and the anode active material layer contains a carbon material and has a thickness of 30 μm or more. The electrolytic solution contains a solvent and an electrolyte salt, and the solvent contains at least one of sulfone compounds such as a cyclic disulfonic acid anhydride.

28 Claims, 4 Drawing Sheets

(56) References Cited

U.S. PATENT DOCUMENTS

2006/0286459 A1 12/2006 Zhao et al.
2008/0286648 A1* 11/2008 Ihara et al. .................. 429/188

FOREIGN PATENT DOCUMENTS

| | | |
|---|---|---|
| JP | 2002008718 A * | 1/2002 |
| JP | 2004-022336 | 1/2004 |
| JP | 2004022336 A * | 1/2004 |
| JP | 2004-253296 | 9/2004 |
| JP | 2005-135701 | 5/2005 |
| JP | 2005-228631 | 8/2005 |
| JP | 3760539 | 1/2006 |
| JP | 2006-344391 | 12/2006 |
| KR | 20060107410 | 10/2006 |

* cited by examiner

BATTERY

CROSS REFERENCES TO RELATED APPLICATIONS

The present application is a continuation-in-part of application Ser. No. 12/141,565 filed on Jun. 18, 2008, which claims priority to claims priority to Japanese Patent Application JP 2007-179385 filed in the Japanese Patent Office on Jul. 9, 2007, the entire contents of which being incorporated herein by reference.

BACKGROUND

The present application relates to a battery including a cathode, an anode, and an electrolytic solution.

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a secondary battery using insertion and extraction of lithium (Li) for charge and discharge reaction (so-called lithium ion secondary battery) is extremely prospective, since such a secondary battery provides a higher energy density compared to a lead battery and a nickel cadmium battery.

As a composition of material for the lithium ion secondary battery, the composition in which a carbon material is used as an anode active material of the anode, a complex oxide of lithium and a transition metal is used as a cathode active material of the cathode, and a mixture of ester carbonate is used as a solvent of the electrolytic solution is known. Since ester carbonate has superior oxidation resistance and superior reduction resistance compared to water or other organic solvent, a high voltage is thereby obtained.

Further, as a battery structure of the lithium ion secondary battery, a laminated film type structure using a package member such as an aluminum laminated film is practically used, since the laminated film type lithium ion secondary battery is lightweight and has a high energy density. In particular, a secondary battery in which an electrolytic solution is held by a polymer compound to obtain a gelatinous state (so-called polymer secondary battery) is widely used, since deformation of the package member is thereby inhibited.

To further obtain a higher capacity in the lithium ion secondary battery using the carbon material as an anode active material, as one method, there is a method to increase the occupancy ratio of the anode active material in the battery by increasing the thickness of the anode active material layer and increasing the volume density. To increase the thickness of the anode active material layer is hereinafter referred to as "thickening of the anode active material layer," and to increase the volume density of the anode active material layer is hereinafter referred to as "increase of the volume density of the anode active material layer."

However, when the thickness of the anode active material layer is increased and the volume density of the anode active material layer is increased, while a higher capacity is obtained, the impregnation characteristics of the electrolytic solution to the anode active material layer are lowered or intercalation efficiency of lithium ions in charge is lowered. Accordingly, in some cases, lithium becomes a dendrite to be precipitated and loses its activity. In the result, internal short circuit may be generated and thus the cycle characteristics may be lowered.

As a method to solve the foregoing issue, there is a method in which as a solvent of the electrolytic solution, a chain ester carbonate (low-viscosity solvent) such as dimethyl carbonate and ethyl methyl carbonate is used. However, when the chain ester carbonate is used in the laminated film type secondary battery, while intercalation efficiency of lithium ions is improved, the secondary battery is easily swollen due to gas generated under the high temperature atmosphere, and the cycle characteristics are lowered as a result. In this case, it is possible to inhibit the secondary battery from being swollen by using diethyl carbonate as the chain ester carbonate. However, when the thickness of the anode active material layer is increased and the volume density of the anode active material layer is increased, the cycle characteristics are drastically lowered.

Further, as another method to solve the foregoing issue, there is a method in which propylene carbonate or γ-butyrolactone having a high electric conductivity is used together with ethylene carbonate or various chain ester carbonates to improve insertion ability of lithium ions. However, when propylene carbonate or the like is used in the case of using a carbon material as an anode active material, the propylene carbonate or the like is reacted with the anode and is decomposed, and thus the cycle characteristics are lowered. Such a tendency is significant when graphite is used as an anode material.

In addition, to solve the foregoing issue, a method to add various additives to the electrolytic solution has been considered. Specifically, to improve the cycle characteristics, the storage characteristics, the load characteristics or the like, as an additive, a sulfone-based compound such as a chain disulfonic acid anhydride (for example, refer to Japanese Patent No. 3760539, Japanese Unexamined Patent Application Publication No. 2004-253296, and Japanese Unexamined Patent Application Publication No. 2006-344391), a cyclic disulfonic acid anhydride (for example, refer to Japanese Unexamined Patent Application Publication No. 2004-022336), a chain sulfonic acid/carboxylic acid anhydride (for example, refer to Japanese Unexamined Patent Application Publication No. 2002-008718), and a cyclic disulfonic acid ester compound (for example, refer to Japanese Unexamined Patent Application Publication Nos. 2005-135701 and 2005-228631) is used. In such a method, the sulfone-based compound is decomposed in the initial charge and discharge, and a coat is formed on the surface of the electrode. Thereby, intercalation efficiency of lithium ions in charge is improved and decomposition of the electrolytic solution is inhibited, and thus the cycle characteristics and the like are improved.

SUMMARY

The high performance and the multi functions of the recent portable electronic devices tend to be increasingly developed. Thus, charge and discharge of the secondary battery are frequently repeated, and thereby the discharge capacity tends to be lowered. Accordingly, further improvement of the cycle characteristics has been aspired in addition to a higher capacity of the secondary battery.

In view of the foregoing, it is desirable to provide a battery capable of improving the cycle characteristics even if the thickness of the anode active material layer is increased.

According to an embodiment, there is provided a battery including a cathode, an anode, and an electrolytic solution. The anode has an anode active material layer on an anode current collector. The anode active material layer contains a carbon material and has a thickness of 30 μm or more. The electrolytic solution contains a solvent and an electrolyte salt. The solvent contains at least one of sulfone compounds shown in Chemical formula 1 and Chemical formula 2.

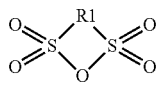

Chemical formula 1 where R1 represents $C_mH_{2m-n}X_n$, and X represents a halogen; m represents one of integer numbers of from 2 to 4; and n represents one of integer numbers of from 0 to 2m.

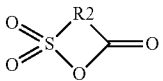

Chemical formula 2 where R2 represents $C_jH_{2j-k}X_k$, and X represents a halogen; j represents one of integer numbers of from 2 to 4; and k represents one of integer numbers of from 0 to 2j.

According to the battery of the embodiment, the anode active material layer of the anode contains the carbon material, and has a thickness of 30 μm or more. The solvent of the electrolytic solution contains at least one of the sulfone compounds shown in Chemical formula 1 and Chemical formula 2. Thus, intercalation efficiency of the electrode reactant in charge is improved and decomposition of the electrolytic solution in charge and discharge is inhibited. Therefore, even if the thickness of the anode active material layer is increased to obtain a high capacity, the cycle characteristics may be improved.

Additional features and advantages are described herein, and will be apparent from the following Detailed Description and the figures.

DETAILED DESCRIPTION

Embodiments will be hereinafter described in detail with reference to the drawings.

First Embodiment

Figure 1:
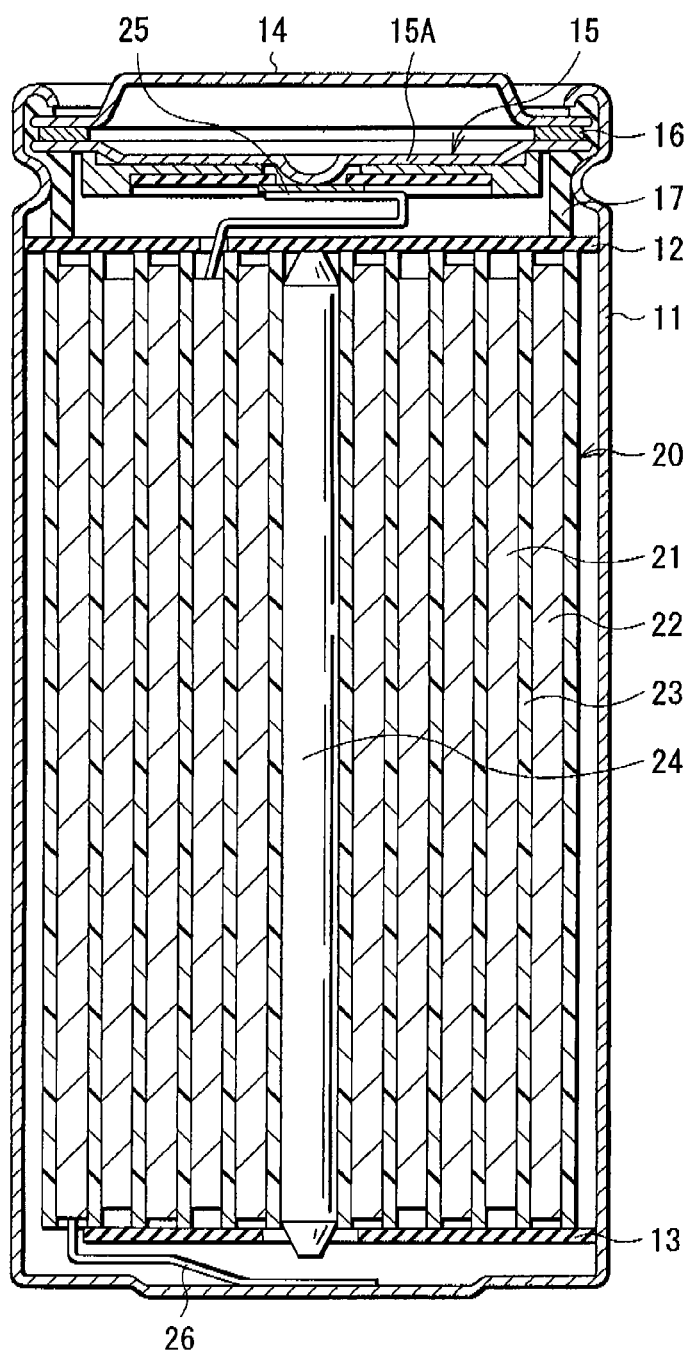
FIG. 1 is a cross section showing a structure of a battery according to a first embodiment.

FIG. 1 shows a cross sectional structure of a battery according to a first embodiment. The battery is a lithium ion secondary battery in which the anode capacity is expressed based on insertion and extraction of lithium as an electrode reactant.

In the secondary battery, a spirally wound electrode body 20 in which a cathode 21 and an anode 22 are layered with a separator 23 in between and spirally wound, and a pair of insulating plates 12 and 13 are contained in a battery can 11 in the shape of an approximately hollow cylinder. The battery can 11 is made of, for example, iron plated by nickel. One end of the battery can 11 is closed, and the other end thereof is opened. The pair of insulating plates 12 and 13 is respectively arranged perpendicular to the winding periphery face, so that the spirally wound electrode body 20 is sandwiched between the insulating plates 12 and 13. The battery structure using the cylindrical battery can 11 is called cylindrical type.

At the open end of the battery can 11, a battery cover 14, and a safety valve mechanism 15 and a Positive Temperature Coefficient (PTC) device 16 provided inside the battery cover 14 are attached by being caulked with a gasket 17. Inside of the battery can 11 is thereby hermetically closed. The battery cover 14 is, for example, made of a material similar to that of the battery can 11. The safety valve mechanism 15 is electrically connected to the battery cover 14 through the PTC device 16. If the internal pressure of the battery becomes a certain level or more due to internal short circuit, external heating or the like, a disk plate 15A flips to cut the electric connection between the battery cover 14 and the spirally wound electrode body 20. The PTC device 16 limits a current by increasing the resistance value in accordance with increase in temperature to prevent abnormal heat generation by a large current. The gasket 17 is made of, for example, an insulating material and its surface is coated with asphalt.

A center pin 24 may be inserted in the center of the spirally wound electrode body 20. In the spirally wound electrode body 20, a cathode lead 25 made of aluminum (Al) or the like is connected to the cathode 21, and an anode lead 26 made of nickel (Ni) or the like is connected to the anode 22. The cathode lead 25 is electrically connected to the battery cover 14 by being welded to the safety valve mechanism 15. The anode lead 26 is welded and electrically connected to the battery can 11.

Figure 2:
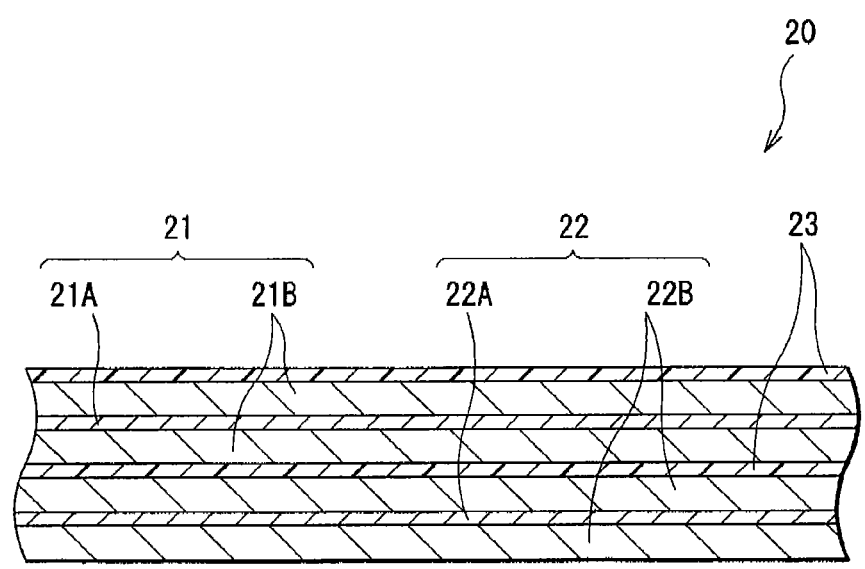
FIG. 2 is a cross section showing an enlarged part of the spirally wound electrode body shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. The cathode active material layer 21B may be provided on only a single face of the cathode current collector 21A.

The cathode current collector 21A is made of, for example, a metal material such as aluminum, nickel, and stainless. The cathode active material layer 21B contains as a cathode active material, one or more cathode materials capable of inserting and extracting lithium as an electrode reactant. The cathode active material layer 21B may contain an electrical conductor such as a carbon material and a binder such as polyvinylidene fluoride according to needs. As the cathode material capable of inserting and extracting lithium, for example, a chalcogenide not containing lithium such as iron sulfide ($FeS_2$), titanium sulfide ($TiS_2$), molybdenum sulfide ($MoS_2$), niobium selenide ($NbSe_2$), and vanadium oxide ($V_2O_5$), a lithium-containing compound that contains lithium or the like is cited.

Specially, the lithium-containing compound are preferable, since in some cases, a high voltage and a high energy density is thereby obtained. As the lithium-containing compound, for example, a complex oxide containing lithium and a transition metal element or a phosphate compound containing lithium and a transition metal element is cited. In particular, a compound containing at least one selected from the group consisting of cobalt, nickel, manganese, and iron is preferable, since thereby a higher voltage is obtained. The chemical formula thereof is expressed by, for example, $Li_xMIO_2$ or $Li_yMIIPO_4$. In the formula, MI and MII represent one or more transition metal elements. Values of x and y vary according to charge and discharge states of the battery, and are generally in the range of $0.05 \leq x \leq 1.10$ and $0.05 \leq y \leq 1.10$.

As a specific example of the complex oxide containing lithium and a transition metal element, a lithium-cobalt complex oxide ($Li_xCoO_2$), a lithium-nickel complex oxide ($Li_xNiO_2$), a lithium-nickel-cobalt complex oxide ($Li_xNi_{1-z}Co_zO_2$ (z<1)), a lithium-nickel-cobalt-manganese complex oxide ($Li_xNi_{1(1-v-w)}Co_vMn_wO_2$ (v+w<1)), lithium-manganese complex oxide having a spinel structure ($LiMn_2O_4$) and the like are cited. Specially, the complex oxide containing nickel is preferable, since thereby a high capacity and superior cycle characteristics are obtained. As the phosphate compound containing lithium and a transition metal element, for example, lithium-iron phosphate compound ($LiFePO_4$), a lithium-iron-manganese phosphate compound ($LiFe_{1-u}Mn_uPO_4$(u<1)) or the like is cited.

In addition, as the foregoing cathode material, for example, an oxide such as titanium oxide, vanadium oxide, and manganese dioxide; sulfur; and a conductive polymer such as polyaniline and polythiophene are cited.

The thickness and the volume density of the cathode active material layer 21B are not particularly limited, but thickening of the cathode active material layer 21B and increase of the volume density of the cathode active material layer 21B are preferably implemented to obtain a high capacity. For the details of the thickness and the volume density of the cathode active material layer 21B, a description will be hereinafter given together with the after-mentioned description of the thickness and the volume density of the anode active material layer 22B. The thickness and the volume density of the cathode active material layer 21B may correspond with or may be different from the thickness and the volume density of the anode active material layer 22B.

The anode 22 has a structure in which an anode active material layer 22B is provided on the both faces of an anode current collector 22A having a pair of opposed faces. The anode active material layer 22B may be provided only on a single face of the anode current collector 22A.

The anode current collector 22A is preferably made of a metal material having favorable electrochemical stability, electric conductivity, and mechanical strength. As the metal material, for example, copper (Cu), nickel, stainless or the like is cited. Specially, copper is preferable as the metal material, since thereby high electric conductivity is obtained.

In particular, as the metal material composing the anode current collector 22A, the metal material containing one or more metal elements not forming an intermetallic compound with lithium is preferable. If the intermetallic compound is formed with lithium, the anode current collector 22A is expanded and shrunk to be damaged in charge and discharge. In the result, the current collectivity may be lowered, or the anode active material layer 22B may be separated from the anode current collector 22A. As the metal element, for example, copper, nickel, titanium (Ti), iron, chromium (Cr) or the like is cited.

The anode active material layer 22B contains, as an anode active material, one or more anode materials capable of inserting and extracting lithium as an electrode reactant. The anode active material layer 22B may contain an electrical conductor, a binder and the like according to needs.

The anode material capable of inserting and extracting lithium contains a carbon material. In the carbon material, a change in crystal structure occurred in charge and discharge is extremely small, the electrochemical equivalent is large, and thereby a high energy density is obtained. As the carbon material, for example, graphite, non-graphitizable carbon, graphitizable carbon and the like are cited. More specifically, pyrolytic carbons, coke, glassy carbon fiber, an organic polymer compound fired body, activated carbon, carbon black or the like is cited. Of the foregoing, the coke includes pitch coke, needle coke, petroleum coke and the like. The organic polymer compound fired body is obtained by firing and carbonizing a phenol resin, a furan resin or the like at an appropriate temperature. One of the carbon materials may be used singly, or a plurality thereof may be used by mixture. The shape of the carbon material may be any of a fibrous shape, a spherical shape, a granular shape, and a scale-like shape.

More specifically, as the carbon material, graphite is preferable, and in particular, graphite in which the lattice spacing $d_{002}$ in the C-axis direction measured by X-ray diffraction method is 0.340 nm or less is more preferable, since a higher energy density is thereby obtained. The foregoing lattice spacing $d_{002}$ is measured by X-ray diffraction method in which, for example, CuKα-ray is used as an X-ray and high purity silicon is used as a reference material (Sugio Otani, "Carbon fiber," pp. 733-742 (1986), Kindai Henshu).

In particular, as graphite, artificial graphite is preferable to natural graphite. The artificial graphite has a high particle hardness. Thus, even if the volume density of the anode active material layer 22B is increased, the lamellar structure is maintained, and thus insertion and extraction of lithium are efficiently performed. As the artificial graphite, for example, particulate graphite powder (Mesocarbon Microbead (MCMB)) or the like is cited.

The foregoing particle hardness of graphite particle may be obtained by, for example, St (Sx)=2.8 P/(×d×d) where the breaking strength (Pa) is St (Sx), the test force (N) is P, and a particle diameter (mm) is d. The breaking strength may be measured by, for example, a small compression tester MCT-W500 (manufactured by Shimadzu Corporation).

Other conditions such as the specific surface area of the carbon material may be voluntarily set according to the demanded performance of the anode and the like.

As the anode material capable of inserting and extracting lithium may contain, for example, a material capable of inserting and extracting lithium and containing at least one of a metal element and a metalloid element as an element, in addition to the foregoing carbon material, since a higher energy density is thereby obtained. As the foregoing metal element or the foregoing metalloid element, for example, a metal element or a metalloid element capable of forming an alloy with lithium is preferable. Specifically, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) and the like are cited. More specifically, at least one selected from the group consisting of silicon and tin is preferable. Silicon and tin have the high ability to insert and extract lithium, and thus provides an extremely high energy density. As a material containing at least one of silicon and tin, for example, the simple substance, an alloy, or a compound of silicon; the simple substance, an alloy, or a compound of tin;

or a material having one or more phases thereof at least in part is cited. In addition, as the foregoing metal element, titanium (Ti) capable of forming a complex oxide with lithium or the like is cited.

As the electrical conductor, for example, a carbon material such as graphite, carbon black, and Ketjen black are cited. Such a carbon material may be used singly, or a plurality thereof may be used by mixture. The electrical conductor may be a metal material, a conductive polymer or the like as long as the material has the conductivity.

As the binder, for example, a synthetic rubber such as styrene-butadiene rubber, fluorinated rubber, and ethylene propylene diene; or a polymer material such as polyvinylidene fluoride is cited. One thereof may be used singly, or a plurality thereof may be used by mixture. When the cathode 21 and the anode 22 are spirally wound, the styrene-butadiene rubber, the fluorinated rubber or the like having flexibility is preferable.

In the secondary battery, by thickening the anode active material layer 22B, the volume occupied by the anode current collector 22A and the separator 23 in the battery is decreased and the energy density is improved. Therefore, the thickness of the anode active material layer 22B on a single face side of the anode current collector 22A is 30 μm or more. If the thickness of the anode active material layer 22B is excessively increased, there is a possibility that intercalation efficiency of lithium ions is not sufficiently improved and decomposition of the electrolytic solution is not sufficiently inhibited. Thus, the thickness of the anode active material layer 22B on a single face side of the anode current collector 22A is preferably 100 μm or less.

Further, the volume density of the anode active material layer 22B is preferably in the range from 1.40 g/cm$^3$ to 1.95 g/cm$^3$. Thereby, the cycle characteristics are further improved. More specifically, if the volume density of the anode active material layer 22B is smaller than 1.40 g/cm$^3$, there is a possibility that a sufficient energy density may not be obtained. Meanwhile, if the volume density of the anode active material layer 22B is larger than 1.95 g/cm$^3$, intercalation efficiency of lithium ions may be lowered or the impregnation characteristics of the electrolytic solution to the anode active material layer 22B may be lowered. In particular, the volume density of the anode active material layer 22B is more preferably in the range from 1.60 g/cm$^3$ to 1.95 g/cm$^3$, and much more preferably in the range from 1.60 g/cm$^3$ to 1.85 g/cm$^3$. Thereby, a higher effect is obtained.

In the secondary battery, it is preferable that the charge capacity of the anode active material is larger than the charge capacity of the cathode active material by adjusting the amount of the cathode active material and the amount of the anode material capable of inserting and extracting lithium.

The separator 23 separates the cathode 21 from the anode 22, prevents current short circuit due to contact of the both electrodes, and passes lithium ions. The separator 23 is made of, for example, a porous film made of a synthetic resin such as polytetrafluoroethylene, polypropylene, and polyethylene, or a ceramic porous film. The separator 23 may have a structure in which two or more of the foregoing porous films are layered. Specially, the porous film made of polyolefin is preferable, since such a film has a superior short circuit preventive effect and improves battery safety by shutdown effect. In particular, polyethylene is preferable, since polyethylene provides shutdown effect at from 100 deg C. to 160 deg C. and has superior electrochemical stability. Further, polypropylene is also preferable. In addition, as long as chemical stability is secured, a resin formed by copolymerizing or blending with polyethylene or polypropylene may be used.

For example, an electrolytic solution as a liquid electrolyte is impregnated in the separator 23. The electrolytic solution contains a solvent and an electrolyte salt dissolved in the solvent.

The solvent contains at least one of the sulfone-based compounds shown in Chemical formula 1 and Chemical formula 2. Thereby, a sulfone coat is formed on the surface of the cathode 21 and the anode 22. Thus, even in the case that the thickness of the anode active material layer 22B containing the carbon material as an anode active material is increased, intercalation efficiency of lithium ions is improved, and decomposition reaction of the electrolytic solution is inhibited. The compound shown in Chemical formula 1 is a so-called disulfonic acid anhydride. The compound shown in Chemical formula 2 is a so-called sulfonic acid/carboxylic acid anhydride. As X (halogen) shown in Chemical formula 1 and Chemical formula 2, for example, fluorine (F), chlorine (Cl), bromine (Br) or the like is cited. It is needless to say that X may be other type of halogen.

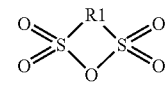

Chemical formula 1 where R1 represents $C_mH_{2m-n}X_n$, and X represents a halogen; m represents one of integer numbers of from 2 to 4; and n represents one of integer numbers of from 0 to 2m.

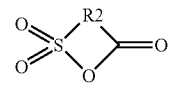

Chemical formula 2 where R2 represents $C_jH_{2j-k}X_k$, and X represents a halogen; j represents one of integer numbers of from 2 to 4; and k represents one of integer numbers of from 0 to 2j.

The content of the sulfone compounds shown in Chemical formula 1 and Chemical formula 2 in the solvent is preferably in the range from 0.05 wt % to 5 wt %, since thereby the cycle characteristics are further improved. More specifically, if the content is smaller than 0.05 wt %, there is a possibility that the coat is not sufficiently formed. Meanwhile, if the content is larger than 5 wt %, the internal resistance may be excessively increased. In particular, the foregoing content is more preferably in the range from 0.05 wt % to 2 wt %, since thereby higher effects are obtained.

As the sulfone compound shown in Chemical formula 1, the compounds shown in Chemical formula 3 and Chemical formula 4 are cited, since thereby sufficient effects are obtained. Such a compound may be used singly, or a plurality thereof may be used by mixture. It is needless to say that the sulfone compound is not limited to the compounds shown in Chemical formula 3 and Chemical formula 4, and the sulfone compound may be other compound as long as such a compound is the compound shown in Chemical formula 1.

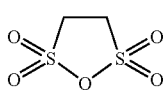

Chemical formula 3

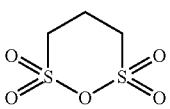

Chemical formula 4

As the sulfone compound shown in Chemical formula 2, for example, the compound shown in Chemical formula 5 is cited. Such a compound may be used singly, or may be used by being mixed with other one or more sulfone compounds. It is needless to say that the sulfone compound is not limited to the compound shown in Chemical formula 5, and the sulfone compound may be other compound as long as such a compound is the compound shown in Chemical formula 2.

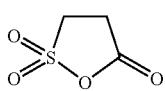

Chemical formula 5

The solvent may contain other nonaqueous solvent such as an organic solvent in addition to at least one of the sulfone compounds shown in Chemical formula 1 and Chemical formula 2. As the nonaqueous solvent, for example, a high-dielectric constant solvent, a low-viscosity solvent and the like are cited.

As the high-dielectric constant solvent, a cyclic ester carbonates such as ethylene carbonate, propylene carbonate, butylene carbonate, and 1,3-dioxole-2-one; lactones such as γ-butyrolactone and γ-valerolactone; a lactam such as N-methylpyrrolidinone; cyclic carbamic acid esters such as N-methyloxazolidinone; and sulfone compounds such as tetramethylene sulfone are cited.

As the low-viscosity solvent, a chain ester carbonates such as dimethyl carbonate, diethyl carbonate, ethyl methyl carbonate, and methyl propyl carbonate; a chain carboxylic acid ester such as methyl acetate, ethyl acetate, methyl propionate, ethyl propionate, methyl butyrate, methyl isobutyrate, trimethylacetic acid methyl and trimethylacetic acid ethyl; chain amides such as N,N-dimethyl acetamide; chain carbamic acid esters such as N,N-diethyl carbamic acid methyl and N,N-diethyl carbamic acid ethyl; and ethers such as 1,2-dimethoxyethane, tetrahydrofuran, 2-methyltetrahydrofuran, tetrahydropyran, and 1,3-dioxolane are cited.

The foregoing high-dielectric constant solvent and the foregoing low-viscosity solvent may be used singly, or two or more thereof may be used by mixture. In particular, at least one selected from the group consisting of ethylene carbonate, propylene carbonate, dimethyl carbonate, diethyl carbonate, and ethyl methyl carbonate is preferable. Thereby, a favorable capacity, favorable cycle characteristics, favorable storage characteristics and the like are obtained. In this case, in particular, a mixture of the high-dielectric constant solvent such as ethylene carbonate and propylene carbonate (for example, dielectric constant $\in \geq 30$) and the low-viscosity solvent such as dimethyl carbonate, ethyl methyl carbonate, and diethyl carbonate (for example, viscosity$\leq$1 mPa·s) is preferable. Thereby, the dissociation property of the electrolyte salt and the ion mobility are improved.

The solvent preferably contains a cyclic ester carbonate having a halogen as an element shown in Chemical formula 6. Thereby, a strong and stable coat is formed on the surface of the cathode 21 and the anode 22, and thus the decomposition reaction of the electrolytic solution is significantly inhibited.

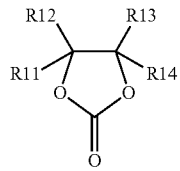

Chemical formula 6 where R11, R12, R13, and R14 represent a hydrogen group, a halogen group, an alkyl group, or an alkyl halide group; and at least one thereof is the halogen group or the alkyl halide group.

As the cyclic ester carbonate having a halogen shown in Chemical formula 6, for example, 4-fluoro-1,3-dioxolane-2-one, 4-chloro-1,3-dioxolane-2-one, 4,5-difluoro-1,3-dioxolane-2-one, 4-trifluoromethyl-1,3-dioxolane-2-one or the like is cited. One thereof may be used singly, or a plurality thereof may be used by mixture. Specially, at least one of 4-fluoro-1,3-dioxolane-2-one and 4,5-difluoro-1,3-dioxolane-2-one is more preferable, since these cyclic ester carbonates are easily available, and provides sufficient effects. In particular, as 4,5-difluoro-1,3-dioxolane-2-one, a trans isomer is preferable to a cis isomer to obtain higher effects.

The electrolyte salt contains, for example, one or more light metal salts such as a lithium salt. As the lithium salt, for example, an inorganic acid lithium salt such as lithium hexafluorophosphate, lithium tetrafluoroborate, lithium hexafluoroarsenate ($LiAsF_6$), lithium hexafluoroantimonate ($LiSbF_6$), lithium perchlorate ($LiClO_4$), and lithium tetrachloroaluminate ($LiAlCl_4$); and a lithium salt of a perfluoroalkane sulfone acid derivative such as lithium trifluoromethanesulfonate, lithium bis(trifluoromethanesulfone) imide, lithium bis(pentafluoromethanesulfone)methide, and lithium tris(trifluoromethanesulfone) methide are cited. One thereof may be used singly, or a plurality thereof may be used by mixture. Specially, lithium hexafluorophosphate is preferable, since the internal resistance is lowered, and the cycle characteristics are improved. In particular, a mixture of lithium hexafluorophosphate and lithium tetrafluoroborate is more preferable, since thereby the cycle characteristics are further improved and the load characteristics are improved.

The content of the electrolyte salt is preferably in the range from 0.3 mol/kg to 3.0 mol/kg to the solvent. In the case that the content is out of the range, the ion conductivity is extremely lowered and thus there is a possibility that a battery capacity and the like may not be obtained sufficiently.

In the secondary battery, when charged, for example, lithium ions are extracted from the cathode 21 and inserted in the anode 22 through the electrolytic solution. Meanwhile, when discharged, lithium ions are extracted from the anode 22 and inserted in the cathode 21 through the electrolytic solution.

The secondary battery may be manufactured, for example, by the following procedure.

First, the cathode 21 is formed by forming the cathode active material layer 21B on the both faces of the cathode current collector 21A. In this case, for example, cathode active material powder, an electrical conductor, and a binder are mixed to prepare a cathode mixture, which is dispersed in a solvent to form paste cathode mixture slurry. Subsequently, the cathode current collector 21A is uniformly coated with the cathode mixture slurry. After the resultant is dried, the resultant is compression-molded.

Further, the anode 22 is formed by forming the anode active material layer 22B on the both faces of the anode current collector 22A. In this case, for example, anode active material powder and a binder are mixed to prepare an anode mixture, which is dispersed in a solvent to form paste anode mixture slurry. Subsequently, the anode current collector 22A is uniformly coated with the anode mixture slurry. After the resultant is dried, the resultant is compression-molded.

When the cathode active material layer 21B and the anode active material layer 22B are formed, instead of coating the cathode current collector 21A and the anode current collector 22A with the cathode mixture slurry and the anode mixture slurry as described above, the cathode mixture and the anode mixture may be respectively bonded to the cathode current collector 21A and the anode current collector 22A.

Next, the cathode lead 25 is welded to the cathode current collector 21A, and the anode lead 26 is welded to the anode current collector 22A. After that, the cathode 21 and the anode 22 are spirally wound with the separator 23 in between to form the spirally wound electrode body 20. Subsequently, the end of the cathode lead 25 is welded to the safety valve mechanism 15, and the end of the anode lead 26 is welded to the battery can 11. After that, while the spirally wound electrode body 20 is sandwiched between the pair of insulating plates 12 and 13, the spirally wound electrode body 20 is contained in the battery can 11. Subsequently, the electrolytic solution is injected into the battery can 11, and impregnated in the separator 23. Finally, the battery cover 14, the safety valve mechanism 15, and the PTC device 16 are fixed at the open end of the battery can 11 by being caulked with the gasket 17. The secondary battery shown in FIG. 1 and FIG. 2 is thereby fabricated.

According to the secondary battery of this embodiment, the anode active material layer 22B of the anode 22 contains the carbon material as an anode active material and has a thickness of 30 μm or more, and the solvent of the electrolytic solution contains at least one of the sulfone compounds shown in Chemical formula 1 and Chemical formula 2. Thus, even if the thickness of the anode active material layer 22B is 30 μm or more, intercalation efficiency of lithium ions in charge is improved and decomposition reaction of the electrolytic solution in charge and discharge is inhibited. Therefore, even when charge and discharge are repeated, the discharge capacity is hardly lowered. In the result, even if the thickness of the anode active material layer 22B is increased to obtain a high capacity, the cycle characteristics are improved.

In particular, when the anode active material layer 22B contains artificial graphite as an anode active material, the capacity is further increased.

Further, when the content of at least one of the sulfone compounds shown in Chemical formula 1 and Chemical formula 2 in the solvent is in the range from 0.05 wt % to 2 wt %, when the volume density of the anode active material layer 22B is in the range from 1.60 g/cm$^3$ to 1.95 g/cm$^3$, or when the solvent contains the cyclic ester carbonate having a halogen shown in Chemical formula 6, the cycle characteristics is further improved.

Further, when the electrolyte salt contains lithium hexafluorophosphate and lithium tetrafluoroborate, the cycle characteristics are further improved and the load characteristics are improved.

Second Embodiment

A description will be hereinafter given of a second embodiment.

Figure 3:
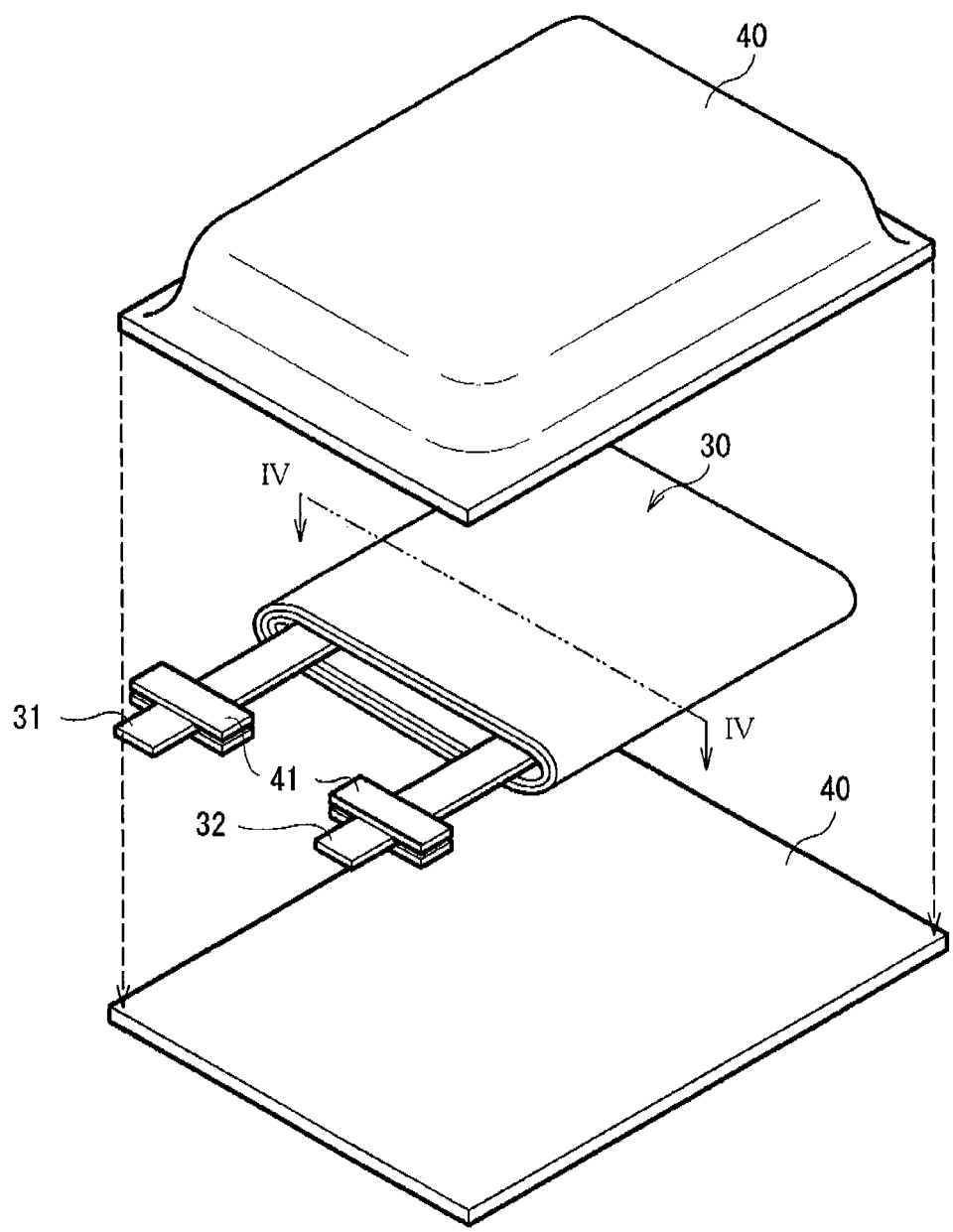
FIG. 3 is an exploded perspective view showing a structure of a battery according to a second embodiment.

FIG. 3 shows an exploded perspective structure of a battery of this embodiment. In the battery, a spirally wound electrode body 30 to which a cathode lead 31 and an anode lead 32 are attached is contained in a film package member 40. The battery is a so-called laminated type secondary battery.

The cathode lead 31 and the anode lead 32 are, for example, derived in the same direction from inside to outside of the package member 40. The cathode lead 31 is made of, for example, a metal material such as aluminum, and the anode lead 32 is made of, for example, a metal material such as copper, nickel, and stainless. The metal material is in the shape of a thin plate or mesh.

The package member 40 is made of a rectangular aluminum laminated film in which, for example, a nylon film, an aluminum foil, and a polyethylene film are bonded together in this order. In the package member 40, for example, the polyethylene film and the spirally wound electrode body 30 are opposed to each other, and the respective outer edges of two pieces of the rectangular aluminum laminated film are contacted to each other by fusion bonding or an adhesive.

Adhesive films 41 to protect from entering of outside air are inserted between the package member 40 and the cathode lead 31, the anode lead 32. The adhesive film 41 is made of a material having contact characteristics to the cathode lead 31 and the anode lead 32. As this kind of material, for example, a polyolefin resin such as polyethylene, polypropylene, modified polyethylene, and modified polypropylene is cited.

The package member 40 may be made of a laminated film having other structure, a polymer film made of polypropylene or the like, or a metal film, instead of the foregoing three-layer aluminum laminated film.

Figure 4:
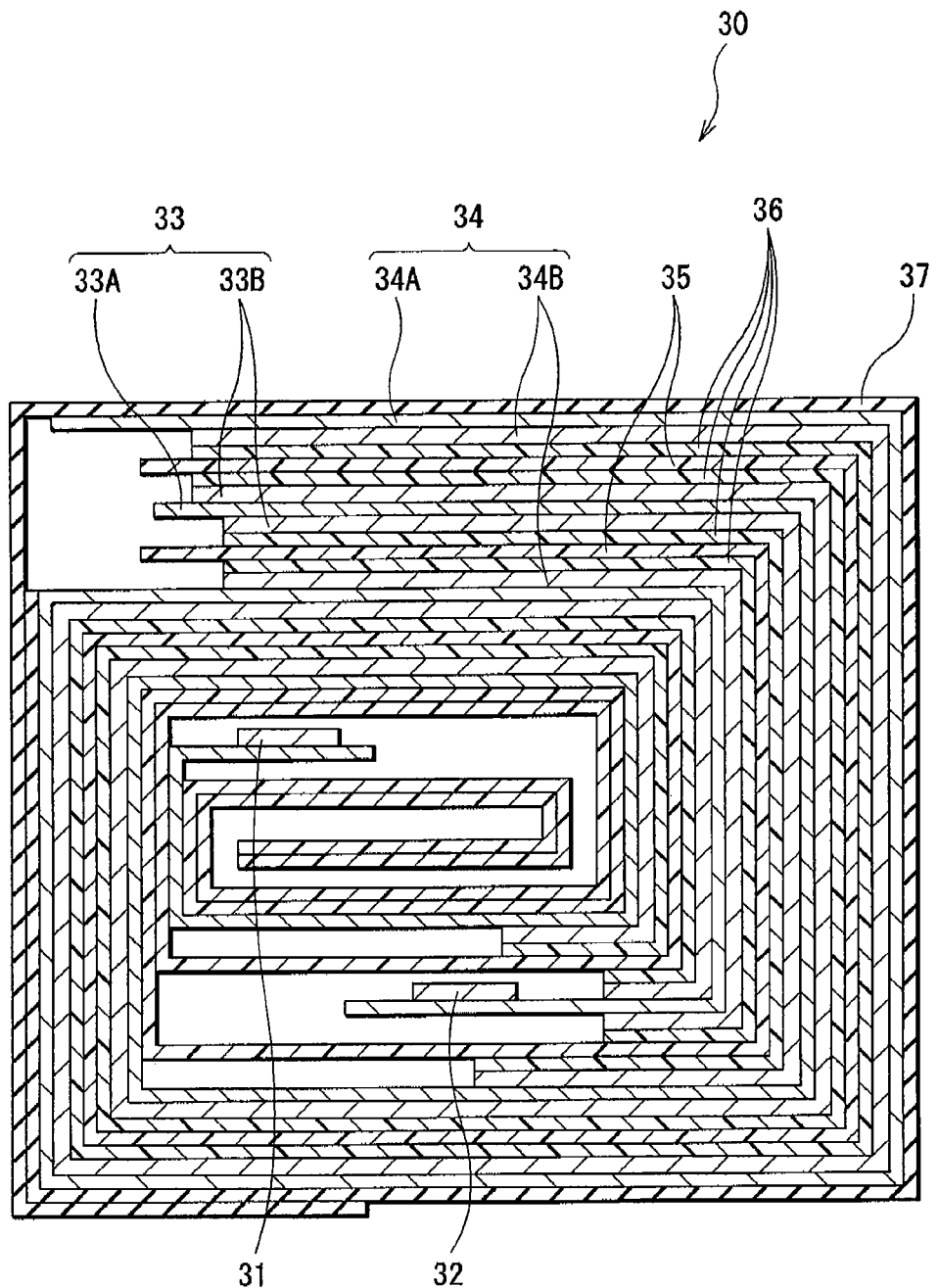
FIG. 4 is a cross section showing a structure taken along line IV-IV of the spirally wound electrode body shown in FIG. 3.

FIG. 4 shows a cross sectional structure taken along line IV-IV of the spirally wound electrode body 30 shown in FIG. 3. In the spirally wound electrode body 30, a cathode 33 and an anode 34 are layered with a separator 35 and an electrolyte 36 in between and then spirally wound. The outermost periphery thereof is protected by a protective tape 37.

The cathode 33 has, for example, a structure in which a cathode active material layer 33B is provided on the both faces of a cathode current collector 33A. The anode 34 has, for example, a structure in which an anode active material layer 34B is provided on the both faces of an anode current collector 34A. Structures of the cathode current collector 33A, the cathode active material layer 33B, the anode current collector 34A, the anode active material layer 34B, and the separator 35 are respectively similar to those of the cathode current collector 21A, the cathode active material layer 21B, the anode current collector 22A, the anode active material layer 22B, and the separator 23 in the first embodiment.

The electrolyte 36 is so-called gelatinous, containing an electrolytic solution and a polymer compound that holds the electrolytic solution. The gel electrolyte is preferable, since a high ion conductivity (for example, 1 mS/cm or more at room temperature) is thereby obtained, and leakage of the battery is thereby prevented. The electrolyte 36 is provided, for example, between the cathode 33 and the separator 35, and between the anode 34 and the separator 35.

The composition of the electrolytic solution is similar to the composition of the electrolytic solution in the first embodiment. However, the solvent in this embodiment means a wide concept including not only the liquid solvent but also a solvent having ion conductivity capable of dissociating the electrolyte salt. Therefore, when the polymer compound having ion conductivity is used, the polymer compound is also included in the solvent.

As the polymer compound, for example, a polymer of vinylidene fluoride such as polyvinylidene fluoride and a copolymer of vinylidene fluoride and hexafluoropropylene having the composition unit shown in Chemical formula 7 is cited. Specially, polyvinylidene fluoride is preferable, since the redox stability thereof is high.

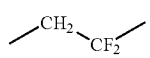

Chemical formula 7

Further, as the polymer compound, a compound formed by polymerizing a polymerizable compound is cited. As the polymerizable compound, for example, a compound including a vinyl group or a group obtained by substituting partial hydrogen of the vinyl group with a substitution group such as a methyl group is cited. In particular, a monofunctional acrylate such as acrylic ester; a monofunctional methacrylate such as methacrylic ester; a multifunctional acrylate such as diacrylic ester and triacrylic ester; a multifunctional methacrylate such as dimethacrylic ester and trimethacrylic ester; acrylonitrile; methacrylonitrile and the like are cited. Specially, ester having an acrylate group or a methacrylate group is preferable, since in such a compound, polymerization easily proceeds and the reaction rate of the polymerizable compound is high. Further, as a polymerizable compound, a compound not including an ether group is preferable. When the ether group is included, lithium ions are coordinated with the ether group, and thereby the ion conductivity is lowered. As such a polymer compound, for example, polyacrylic ester having the composition unit shown in Chemical formula 8 is cited.

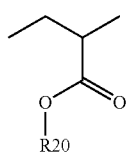

Chemical formula 8 where R20 represents $C_gH_{2h-1}O_h$; g represents one of integer numbers of from 1 to 8; and h represents one of integer numbers of from 0 to 4.

One of the polymerizable compounds may be used singly. However, it is desirable to use a mixture of a monofunctional compound and a multifunctional compound, a single multifunctional compound, or a mixture of a plurality of multifunctional compounds. Thereby, both the mechanical strength and the electrolytic solution holding characteristics of the polymer compound formed by polymerization is easily obtained at the same time.

Further, as the polymer compound, a compound having polyvinyl formal having the composition unit shown in Chemical formula 9 is preferable. The polyvinyl formal is a polymer compound having an acetal group as a composition unit.

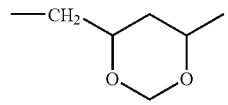

Chemical formula 9

The ratio of the acetal group in polyvinyl formal is preferably in the range from 60 mol % to 80 mol %. In such a range, the solubility with the solvent is improved, and the stability of the electrolyte is further improved. Further, the weight-average molecular weight of polyvinyl formal is preferably in the range from 0.01 million to 0.5 million. If the molecular weight is excessively low, polymerization reaction may hardly proceed. Meanwhile, if the molecular weight is excessively high, the viscosity of the electrolytic solution may be excessively increased.

The foregoing polymer compound may be used singly, or a plurality thereof may be used by mixture as a copolymer. Further, the polymer compound may be obtained by polymerization with the use of a cross-linking agent.

In the secondary battery, when charged, for example, lithium ions are extracted from the cathode 33 and inserted in the anode 34 through the electrolyte 36. Meanwhile, when discharged, lithium ions are extracted from the anode 34 and inserted in the cathode 33 through the electrolyte 36.

The secondary battery including the gel electrolyte 36 may be manufactured, for example, by the following three manufacturing methods.

In the first manufacturing method, first, the cathode 33 is formed by forming the cathode active material layer 33B on the both faces of the cathode current collector 33A, and the anode 34 is formed by forming the anode active material layer 34B on the both faces of the anode current collector 34A by a procedure similar to that of the manufacturing method of the first embodiment. Subsequently, a precursor solution containing an electrolytic solution, a polymer compound, and a solvent is prepared. After the cathode 33 and the anode 34 are coated with the precursor solution, the solvent is volatilized to form the gel electrolyte 36. Subsequently, the cathode lead 31 and the anode lead 32 are respectively attached to the cathode current collector 33A and the anode current collector 34A. Subsequently, the cathode 33 and the anode 34 formed with the electrolyte 36 are layered with the separator 35 in between to obtain a laminated body. After that, the laminated body is spirally wound in the longitudinal direction, the protective tape 37 is adhered to the outermost periphery thereof to form the spirally wound electrode body 30. Finally, for example, after the spirally wound electrode body 30 is sandwiched between two pieces of the film package members 40, outer edges of the package members 40 are contacted by thermal fusion bonding or the like to enclose the spirally wound electrode body 30. Then, the adhesive films 41 are inserted between the cathode lead 31, the anode lead 32 and the package member 40. Thereby, the secondary battery shown in FIG. 3 and FIG. 4 is fabricated.

In the second manufacturing method, first, the cathode lead 31 and the anode lead 32 are respectively attached to the cathode 33 and the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between two pieces of the film package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte 36 is formed. Accordingly, the secondary battery is fabricated.

In the third manufacturing method, first, the spirally wound body is formed and contained in the pouch-like package member 40 in the same manner as that of the foregoing first manufacturing method, except that the separator 35 with the both faces coated with a polymer compound is used. As the polymer compound with which the separator 35 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are cited. As a polymer compound, in addition to the foregoing polymer containing vinylidene fluoride as a component, another one or more polymer compounds may be used. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted to the cathode 33 and the anode 34 with the polymer compound in between. Thereby, the electrolytic solution is impregnated into the polymer compound, and the polymer compound is gelated to form the electrolyte 36. Accordingly, the secondary battery is fabricated. In the third manufacturing method, the swollenness characteristics are improved compared to the first manufacturing method. Further, in the third manufacturing method, the monomer as a raw material of the polymer compound, the solvent and the like hardly remain in the electrolyte 36 compared to in the second manufacturing method, and the steps of forming the polymer compound are favorably controlled. Thus, sufficient contact characteristics are obtained between the cathode 33/the anode 34/the separator 35 and the electrolyte 36.

According to the secondary battery of this embodiment, the anode active material layer 34B of the anode 34 contains the carbon material as an anode active material and has a thickness of 30 μm or more, and the solvent of the electrolytic solution contains at least one of the sulfone compounds shown in Chemical formula 1 and Chemical formula 2. Thus, due to an action similar to that of the first embodiment, even if the thickness of the anode active material layer 34B is increased to obtain a high capacity, the cycle characteristics are improved.

The action and the effect other than the foregoing description of the secondary battery are similar to those of the first embodiment.

EXAMPLES

Examples of the present application will be described in detail.

Example 1-1

As a representative of the foregoing batteries, the laminated film type secondary battery shown in FIG. 3 and FIG. 4 was fabricated by the third manufacturing method in the second embodiment. The secondary battery was manufactured as a lithium ion secondary battery in which the capacity of the anode 34 was expressed based on insertion and extraction of lithium.

First, the cathode 33 was formed. First, 94 parts by weight of lithium cobalt complex oxide ($LiCoO_2$) as a cathode active material, 3 parts by weight of graphite as an electrical conductor, and 3 parts by weight of polyvinylidene fluoride as a binder were mixed to obtain a cathode mixture. Then, the cathode mixture was dispersed in N-methyl-2-pyrrolidone to obtain paste cathode mixture slurry. Subsequently, the both faces of the cathode current collector 33A made of an aluminum foil (thickness: 10 μm) were uniformly coated with the cathode mixture slurry, which was dried. After that, the resultant was compression-molded by a roll pressing machine to form the cathode active material layer 33B. Then, the thickness of the cathode active material layer 33B on a single face side of the cathode current collector 33A was 30 μm. Finally, the cathode current collector 33A on which the cathode active material layer 33B was formed was cut into a strip being 50 mm wide and 300 mm long.

Next, the anode 34 was formed. First, 97 parts by weight of MCMB powder as an anode material and 3 parts by weight of polyvinylidene fluoride as a binder were mixed to obtain an anode mixture. After that, the anode mixture was dispersed in N-methyl-2-pyrrolidone to obtain paste anode mixture slurry. As the MCMB powder, a mixture obtained by mixing powder having an average particle diameter of 30 μm and powder having an average particle diameter of 15 μm at a weight ratio of 50:50 was used. When the physical properties of the MCMB were examined, the particle hardness was 80 MPa, and the lattice spacing $d_{002}$ in the C-axis direction measured by X-ray diffraction method was 0.336 nm. Subsequently, the both faces of the anode current collector 34A made of an electrolytic copper foil (thickness: 10 μm) were uniformly coated with the anode mixture slurry, which was dried. After that, the resultant was compression-molded by a roll pressing machine to form the anode active material layer 34B. The thickness of the anode active material layer 34B on a single face side of the anode current collector 34A was 30 μm. The volume density and the specific surface area of the anode active material layer 34B were respectively 1.85 $mg/cm^3$ and 0.57 $m^2/g$. Finally, the anode current collector 34A on which the anode active material layer 34B was formed was cut into a strip being 50 mm wide and 300 mm long.

Next, an electrolytic solution was prepared. First, as a solvent, ethylene carbonate (EC), diethyl carbonate (DEC), 4-fluoro-1,3-dioxolane-2-one (FEC) as the cyclic ester carbonate having a halogen shown in Chemical formula 6, and the compound shown in Chemical formula 3 as the sulfone compound shown in Chemical formula 1 were mixed. At that time, after EC and DEC were mixed at a weight ratio of 40:60, FEC and the compound of Chemical formula 3 were added thereto so that the respective contents in the solvent were 1 wt % and 0.05 wt %. "Wt %" means a value where the entire solvent is 100 wt %, and the same will be applied to the following examples. After that, lithium hexafluorophosphate (LiPF$_6$) as an electrolyte salt was dissolved in the mixture so that the concentration in the electrolytic solution was 1 mol/kg.

Next, the secondary battery was assembled by using the cathode 33 and the anode 34. First, the cathode lead 31 made of aluminum was welded to one end of the cathode current collector 33A, and the anode lead 32 made of nickel was welded to one end of the anode current collector 34A. Subsequently, the cathode 33, the separator 35 made of a microporous polyethylene film (7 μm thick) with the both faces coated with polyvinylidene fluoride as a polymer compound, and the anode 34 were layered in this order and the resultant laminated body was spirally wound in the longitudinal direction several times. After that, the end of the resultant spirally wound body was fixed by the protective tape 37 made of an adhesive tape to form the spirally wound body as a precursor of the spirally wound electrode body 30. The thickness of the polymer compound on a single face side of the separator 35 was 2 μm. Subsequently, the spirally wound body was sandwiched between the package members 40 made of an aluminum laminated film. After that, outer edges other than the outer edge of one side of the package members 40 were thermally fusion-bonded to enclose the spirally wound electrode body 30 into the pouch-like package member 40. Subsequently, 2 g of the electrolytic solution was injected into the package member 40 through an opening of the package member 40. After that, the opening of the package member 40 was sealed by thermal fusion bonding in the vacuum atmosphere. Finally, the package member 40 was heated at 70 deg C. for 3 minutes while sandwiching the package member 40 between iron plates and applying load thereto. Thus, the polymer compound with which the separator 35 was coated was gelated to form the electrolyte 36. Thereby, the laminated film type secondary battery was fabricated. The capacity of the secondary battery was 800 mAh.

Examples 1-2 to 1-4

A procedure was performed in the same manner as that of Example 1-1, except that the content of the compound of Chemical formula 3 in the solvent was 0.5 wt % (Example 1-2), 2 wt % (Example 1-3), or 5 wt % (Example 1-4).

Examples 1-5 to 1-7

A procedure was performed in the same manner as that of Example 1-2, except that the thickness of the anode active material layer 34B was 40 μm (Example 1-5), 60 μm (Example 1-6), or 100 μm (Example 1-7).

Comparative Example 1-1

A procedure was performed in the same manner as that of Example 1-2, except that thickness of the anode active material layer 34B was 20 μm.

Comparative Examples 1-2 to 1-6

A procedure was performed in the same manner as that of Example 1-1, except that the compound of Chemical formula 3 was not added to the solvent, and the thickness of the anode active material layer 34B was 20 μm (Comparative example 1-2), 30 μm (Comparative example 1-3), 40 μm (Comparative example 1-4), 60 μm (Comparative example 1-5), or 100 μm (Comparative example 1-6).

When the cycle characteristics of the secondary batteries of Examples 1-1 to 1-7 and Comparative examples 1-1 to 1-6 were examined, the results shown in Table 1 were obtained. "Increase in retention ratio" shown in Table 1 means an increase amount of the discharge capacity retention ratio based on presence of the compound of Chemical formula 3. The same will be applied to the after-mentioned examples.

In examining the cycle characteristics, after charge and discharge were performed in the atmosphere at 23 deg C. to measure the discharge capacity, and then charge and discharge were continuously repeated until the total number of charge and discharge was 300 cycles to measure the discharge capacity. After that, the discharge capacity retention ratio (%)=(discharge capacity at the 300th cycle/discharge capacity at the first cycle)×100 was calculated. As charge and discharge conditions, charge was performed at the constant current of 1 C until the battery voltage reached 4.2 V, charge was continuously performed at the constant voltage of 4.2 V until the total charge time from starting charge reached 3 hours. After that, discharge was performed at the constant current of 1 C until the final voltage of 3.0 V. The foregoing "1 C" means a current value with which the theoretical capacity is completely discharged in 1 hour. When the capacity of the secondary battery is 800 mAh, 1 C is 800 mA.

The procedure and the conditions for examining the foregoing cycle characteristics were similarly applied to the following examples and comparative examples.

TABLE 1

Volume density of the anode active material layer: 1.85 g/cm$^3$

| | Anode active material layer Thickness (μm) | Electrolyte salt | Solvent Type | Sulfone compound Type | Weight % | Discharge capacity retention ratio (%) | Increase in retention ratio |
|---|---|---|---|---|---|---|---|
| Example 1-1 | 30 | LiPF$_6$ 1 mol/kg | EC + DEC + FEC | Chemical formula 3 | 0.05 | 75 | — |
| Example 1-2 | | | | | 0.5 | 81 | +16 |
| Example 1-3 | | | | | 2 | 75 | — |
| Example 1-4 | | | | | 5 | 68 | — |
| Example 1-5 | 40 | | | | 0.5 | 75 | +18 |
| Example 1-6 | 60 | | | | | 68 | +27 |
| Example 1-7 | 100 | | | | | 52 | +23 |

TABLE 1-continued

Volume density of the anode active material layer: 1.85 g/cm³

| | Anode active material layer Thickness (μm) | Electrolyte salt | Solvent Type | Sulfone compound Type | Sulfone compound Weight % | Discharge capacity retention ratio (%) | Increase in retention ratio |
|---|---|---|---|---|---|---|---|
| Comparative example 1-1 | 20 | LiPF$_6$ 1 mol/kg | EC + DEC + FEC | Chemical formula 3 | 0.5 | 85 | +1 |
| Comparative example 1-2 | | | | — | — | 84 | — |
| Comparative example 1-3 | 30 | | | | | 65 | — |
| Comparative example 1-4 | 40 | | | | | 57 | — |
| Comparative example 1-5 | 60 | | | | | 41 | — |
| Comparative example 1-6 | 100 | | | | | 29 | — |

As shown in Table 1, when the respective discharge capacity retention ratios were compared based on presence of the compound of Chemical formula 3, in Examples 1-1 to 1-7 and Comparative example 1-1 in which the solvent contained the compound of Chemical formula 3, the discharge capacity retention ratio was higher than that of Comparative examples 1-2 to 1-6 in which the solvent did not contain the compound of Chemical formula 3. The result showed the following fact. That is, when the solvent contained the compound of Chemical formula 3, a sulfone-based coat was formed on the surface of the cathode 33 and the anode 34. Thus, intercalation efficiency of lithium ions in charge was improved and decomposition of the electrolytic solution was inhibited in charge and discharge. In the result, even when charge and discharge were repeated, the discharge capacity was hardly lowered.

In this case, when the respective increase in retention ratios were compared based on the thickness of the anode active material layer 34B, in Examples 1-1 to 1-7 in which the thickness was 30 μm or more, the increase in retention ratio was largely higher than that of Comparative example 1-1 in which the thickness was 20 μm or less. The result showed the following fact. That is, when the solvent contained the compound of Chemical formula 3, in the case that thickening the anode active material layer 34B was implemented, the function of the compound of Chemical formula 3 to improve intercalation efficiency of lithium ions and to inhibit decomposition of the electrolytic solution was distinctly exercised compared to a case that thickening the anode active material layer 34B was not implemented. In the result, the discharge capacity retention ratio was hardly lowered significantly.

Focusing attention on the content of the compound of Chemical formula 3, in Example 1-1 to 1-4, there was a tendency that the discharge capacity retention ratio was higher than that of Comparative example 1-3 irrespective of the content value, and there was a tendency that the discharge capacity retention ratio was increased and then decreased as the content was increased. In this case, if the content was in the range from 0.05 wt % to 5 wt %, the discharge capacity retention ratio was sufficiently high. Further, if the content was in the range from 0.05 wt % to 2 wt %, the discharge capacity retention ratio was 70% or more.

Focusing attention on the thickness of the anode active material layer 34B, in Example 1-2 and 1-5 to 1-7, the discharge capacity retention ratio was higher than that of Comparative examples 1-3 to 1-6 irrespective of the thickness value. In this case, if the thickness was 100 μm or less, the discharge capacity retention ratio was sufficiently high.

Accordingly, in the secondary battery, it was confirmed that the cycle characteristics were improved even if the thickness of the anode active material layer was increased under the condition that the thickness of the anode active material layer was 30 μm or more and the solvent of the electrolytic solution contained the sulfone compound of Chemical formula 3 in the case that the anode active material layer of the anode contained MCMB. In particular, it was confirmed that favorable cycle characteristics were obtained in the case where the content of the compound of Chemical formula 3 in the solvent was in the range from 0.05 wt % to 5 wt %, or the thickness of the anode active material layer was in the range from 30 μm to 100 μm. It was also confirmed that the cycle characteristics were further improved if the foregoing content was in the range from 0.05 wt % to 2 wt %.

Examples 2-1 to 2-3

A procedure was performed in the same manner as that of Examples 1-2, 1-5, and 1-6, except that FEC was not added to the solvent.

Comparative Examples 2-1 to 2-5

A procedure was performed in the same manner as that of Comparative examples 1-1 to 1-5, except that FEC was not added to the solvent.

When the cycle characteristics of the secondary batteries of Examples 2-1 to 2-3 and Comparative examples 2-1 to 2-5 were examined, the results shown in Table 2 were obtained.

TABLE 2

Volume density of the anode active material layer: 1.85 g/cm³

| | Anode active material layer Thickness (µm) | Electrolyte salt | Solvent Type | Sulfone compound Type | Sulfone compound Weight % | Discharge capacity retention ratio (%) | Increase in retention ratio |
|---|---|---|---|---|---|---|---|
| Example 2-1 | 30 | LiPF₆ 1 mol/kg | EC + DEC | Chemical formula 3 | 0.5 | 77 | +18 |
| Example 2-2 | 40 | | | | | 63 | +13 |
| Example 2-3 | 60 | | | | | 54 | +21 |
| Comparative example 2-1 | 20 | LiPF₆ 1 mol/kg | EC + DEC | Chemical formula 3 | 0.5 | 82 | +1 |
| Comparative example 2-2 | | | | — | — | 81 | — |
| Comparative example 2-3 | 30 | | | | | 59 | — |
| Comparative example 2-4 | 40 | | | | | 50 | — |
| Comparative example 2-5 | 60 | | | | | 33 | — |

As shown in Table 2, results similar to the results of Table 1 were also obtained when the solvent did not contain FEC. That is, in Examples 2-1 to 2-3 and Comparative example 2-1 in which the solvent contained the compound of Chemical formula 3, the discharge capacity retention ratio was higher than that of Comparative examples 2-2 to 2-5 in which the solvent did not contain the compound of Chemical formula 3. In Examples 2-1 to 2-3 in which the thickness of the anode active material layer 34B was 30 µm or more, the increase in retention ratio was extremely larger than that of Comparative example 2-1 in which the thickness of the anode active material layer 34B was 20 µm or less.

When the respective discharge capacity retention ratios were compared based on presence of FEC in the solvent, in Examples 1-2, 1-5, and 1-6 in which the solvent contained FEC, the discharge capacity retention ratio was higher than that of Examples 2-1 to 2-3 in which the solvent did not contain FEC. The result showed the following fact. That is, when the solvent contained FEC, a halogen-based coat was formed on the surface of the cathode 33 and the anode 34 and thereby decomposition of the electrolytic solution was inhibited. Thus, even when charge and discharge were repeated, the discharge capacity was hardly lowered.

Accordingly, in the secondary battery, it was confirmed that the cycle characteristics were improved irrespective of presence of the cyclic ester carbonate having a halogen shown in Chemical formula 6 in the solvent. It was also confirmed that the cycle characteristics were further improved when the cyclic ester carbonate having a halogen shown in Chemical formula 6 was added.

No result is herein shown for a case that the solvent contains other cyclic ester carbonate having a halogen such as 4,5-difluoro-1,3-dioxolane-2-one (DFEC). However, since DFEC or the like has characteristics similar to those of FEC, it is evident that similar effects are obtained when the solvent contains DFEC or the like. It is needless to say that such a fact is not limited to a case that the cyclic ester carbonate having a halogen is used singly, but may be similarly applied to a case that a plurality thereof is used by mixture.

Examples 3-1 to 3-6

A procedure was performed in the same manner as that of Examples 1-1 to 1-6, except that the compound shown in Chemical formula 4 was used as the sulfone compound shown in Chemical formula 1.

Examples 3-7 to 3-12

A procedure was performed in the same manner as that of Examples 1-1 to 1-6, except that the compound shown in Chemical formula 5 as the sulfone compound shown in Chemical formula 2 was used instead of the sulfone compound shown in Chemical formula 1.

Comparative Example 3-1

A procedure was performed in the same manner as that of Comparative example 1-1, except that the compound shown in Chemical formula 4 was used as in Examples 3-1 to 3-6.

A procedure was performed in the same manner as that of Comparative example 1-1, except that the compound shown in Chemical formula 5 was used as in Examples 3-7 to 3-12.

When the cycle characteristics of the secondary batteries of Examples 3-1 to 3-12 and Comparative examples 3-1 and 3-2 were examined, the results shown in Table 3 were obtained

TABLE 3

Volume density of the anode active material layer: 1.85 g/cm³

| | Anode active material layer Thickness (μm) | Electrolyte salt | Solvent Type | Sulfone compound Type | Sulfone compound Weight % | Discharge capacity retention ratio (%) | Increase in retention ratio |
|---|---|---|---|---|---|---|---|
| Example 3-1 | 30 | LiPF$_6$ 1 mol/kg | EC + DEC + FEC | Chemical formula 4 | 0.05 | 71 | — |
| Example 3-2 | | | | | 0.5 | 77 | +12 |
| Example 3-3 | | | | | 2 | 70 | — |
| Example 3-4 | | | | | 5 | 66 | — |
| Example 3-5 | 40 | | | | 0.5 | 73 | +16 |
| Example 3-6 | 60 | | | | | 66 | +25 |
| Example 3-7 | 30 | LiPF$_6$ 1 mol/kg | EC + DEC + FEC | Chemical formula 5 | 0.05 | 73 | — |
| Example 3-8 | | | | | 0.5 | 79 | +14 |
| Example 3-9 | | | | | 2 | 71 | — |
| Example 3-10 | | | | | 5 | 68 | — |
| Example 3-11 | 40 | | | | 0.5 | 75 | +18 |
| Example 3-12 | 60 | | | | | 67 | +26 |
| Comparative example 3-1 | 20 | LiPF$_6$ 1 mol/kg | EC + DEC + FEC | Chemical formula 4 | 0.5 | 84 | 0 |
| Comparative example 3-2 | | | | Chemical formula 5 | | 83 | −1 |
| Comparative example 1-2 | | | | — | — | 84 | — |
| Comparative example 1-3 | 30 | | | | | 65 | — |
| Comparative example 1-4 | 40 | | | | | 57 | — |
| Comparative example 1-5 | 60 | | | | | 41 | — |

As shown in Table 3, results similar to the results of Table 1 were also obtained when the solvent contained the compound shown in Chemical formula 4 or the compound shown in Chemical formula 5. That is, in Examples 3-1 to 3-6 and Comparative example 3-1 in which the solvent contained the compound of Chemical formula 4, the discharge capacity retention ratio was higher than that of Comparative examples 1-2 to 1-5 in which the solvent did not contain the compound of Chemical formula 4. In Examples 3-1 to 3-6 in which the thickness of the anode active material layer 34B was 30 μm or more, the retention ration increase portion was extremely larger than that of Comparative example 3-1 in which the thickness of the anode active material layer was 20 μm or less. Further, in Examples 3-7 to 3-12 in which the solvent contained the compound of Chemical formula 5, the discharge capacity retention ratio was higher than that of Comparative examples 1-2 to 1-5 in which the solvent did not contain the compound of Chemical formula 5. In Examples 3-7 to 3-12 in which the thickness of the anode active material layer 34B was 30 μm or more, the increase in retention ratio was extremely larger than that of Comparative example 3-2 in which the thickness of the anode active material layer 34B was 20 μm or less.

In this case, in Examples 3-2, 3-5, 3-6, 3-8, 3-11, and 3-12 in which the solvent contained FEC, the discharge capacity retention ratio was higher than that of Examples 2-1 to 2-3 in which the solvent did not contain FEC. In Examples 3-1 to 3-12, if the content of the compound of Chemical formula 4 or the compound of Chemical formula 5 was in the range from 0.05 wt % to 5 wt %, the discharge capacity retention ratio was sufficiently high. Further, if the content of the compound of Chemical formula 4 or the compound of Chemical formula 5 was in the range from 0.05 wt % to 2 wt %, the discharge capacity retention ratio was 70% or more.

Accordingly, in the secondary battery of an embodiment, it was confirmed that the cycle characteristics were also improved in the case that the solvent contained the sulfone compound shown in Chemical formula 4 or Chemical formula 5. In particular, it was confirmed that favorable cycle characteristics were obtained in the case that the content of the sulfone compound shown in Chemical formula 4 or Chemical formula 5 in the solvent was in the range from 0.05 wt % to 5 wt %. It was also confirmed that the cycle characteristics were further improved in the case that the foregoing content was in the range from 0.05 wt % to 2 wt %.

Examples 4-1 to 4-3

A procedure was performed in the same manner as that of Examples 1-2, 1-5, and 1-6, except that ethyl methyl carbonate (EMC) was added to the solvent. The composition of the solvent (EC:DEC:EMC) was 40:30:30 at a weight ratio.

Examples 4-4 to 4-6

A procedure was performed in the same manner as that of Examples 1-2, 1-5, and 1-6, except that EMC was used instead of DEC as a solvent.

Examples 4-7 to 4-9

A procedure was performed in the same manner as that of Examples 1-2, 1-5, and 1-6, except that dimethyl carbonate (DMC) was used instead of DEC as a solvent.

Comparative Examples 4-1 to 4-5

A procedure was performed in the same manner as that of Comparative examples 1-1 to 1-5, except that EMC was added to the solvent as in Examples 4-1 to 4-3.

Comparative Examples 4-6 to 4-10

A procedure was performed in the same manner as that of Comparative examples 1-1 to 1-5, except that EMC was used as a solvent as in Examples 4-1 to 4-6.

Comparative Examples 4-11 to 4-15

A procedure was performed in the same manner as that of Comparative examples 1-1 to 1-5, except that DMC was used as a solvent as in Examples 4-7 to 4-9.

When the cycle characteristics of the secondary batteries of Examples 4-1 to 4-9 and Comparative examples 4-1 and 4-15 were examined, the results shown in Table 4 were obtained

TABLE 4

Volume density of the anode active material layer: 1.85 g/cm$^3$

| | Anode active material layer Thickness (μm) | Electrolyte salt | Solvent Type | Sulfone compound Type | Sulfone compound Weight % | Discharge capacity retention ratio (%) | Increase in retention ratio |
|---|---|---|---|---|---|---|---|
| Example 4-1 | 30 | LiPF$_6$ 1 mol/kg | EC + DEC + EMC + FEC | Chemical formula 3 | 0.5 | 83 | +13 |
| Example 4-2 | 40 | | | | | 76 | +15 |
| Example 4-3 | 60 | | | | | 64 | +17 |
| Example 4-4 | 30 | LiPF$_6$ 1 mol/kg | EC + EMC + FEC | Chemical formula 3 | 0.5 | 85 | +8 |
| Example 4-5 | 40 | | | | | 80 | +12 |
| Example 4-6 | 60 | | | | | 74 | +16 |
| Example 4-7 | 30 | LiPF$_6$ 1 mol/kg | EC + DMC + FEC | Chemical formula 3 | 0.5 | 88 | +8 |
| Example 4-8 | 40 | | | | | 85 | +11 |
| Example 4-9 | 60 | | | | | 77 | +11 |
| Comparative example 4-1 | 20 | LiPF$_6$ 1 mol/kg | EC + DEC + EMC + FEC | Chemical formula 3 | 0.5 | 86 | 0 |
| Comparative example 4-2 | | | | — | — | 86 | — |
| Comparative example 4-3 | 30 | | | | | 70 | — |
| Comparative example 4-4 | 40 | | | | | 61 | — |
| Comparative example 4-5 | 60 | | | | | 47 | — |
| Comparative example 4-6 | 20 | LiPF$_6$ 1 mol/kg | EC + EMC + FEC | Chemical formula 3 | 0.5 | 87 | 0 |
| Comparative example 4-7 | | | | — | — | 87 | — |
| Comparative example 4-8 | 30 | | | | | 77 | — |
| Comparative example 4-9 | 40 | | | | | 68 | — |
| Comparative example 4-10 | 60 | | | | | 58 | — |
| Comparative example 4-11 | 20 | LiPF$_6$ 1 mol/kg | EC + DMC + FEC | Chemical formula 3 | 0.5 | 91 | +1 |
| Comparative example 4-12 | | | | — | — | 90 | — |
| Comparative example 4-13 | 30 | | | | | 80 | — |
| Comparative example 4-14 | 40 | | | | | 74 | — |
| Comparative example 4-15 | 60 | | | | | 66 | — |

As shown in Table 4, results similar to the results of Table 1 were also obtained when EMC was added to the solvent or when DEC in the solvent was substituted with EMC or DMC.

That is, when EMC was added to the solvent, in Examples 4-1 to 4-3 and Comparative example 4-1 in which the solvent contained the compound of Chemical formula 3, the discharge capacity retention ratio was equal to or higher than that of Comparative examples 4-2 to 4-5 in which the solvent did not contain the compound of Chemical formula 3. In Examples 4-1 to 4-3 in which the thickness of the anode active material layer 34B was 30 µm or more, the increase in retention ratio was largely higher than that of Comparative example 4-1 in which the thickness of the anode active material layer 34B was 20 µm or less.

Further, when EMC was substituted with DEC in the solvent, in Examples 4-4 to 4-6 and Comparative example 4-6 in which the solvent contained the compound of Chemical formula 3, the discharge capacity retention ratio was equal to or higher than that of Comparative examples 4-7 to 4-10 in which the solvent did not contain the compound of Chemical formula 3. In Examples 4-4 to 4-6 in which the thickness of the anode active material layer 34B was 30 µm or more, the increase in retention ratio was largely higher than that of Comparative example 4-6 in which the thickness of the anode active material layer 34B was 20 µm or less.

Further, when DEC was substituted with DMC in the solvent, in Examples 4-7 to 4-9 and Comparative example 4-11 in which the solvent contained the compound of Chemical formula 3, the discharge capacity retention ratio was higher than that of Comparative examples 4-12 to 4-15 in which the solvent did not contain the compound of Chemical formula 3. In Examples 4-7 to 4-9 in which the thickness of the anode active material layer 34B was 30 µm or more, the increase in retention ratio was largely higher than that of Comparative example 4-11 in which the thickness of the anode active material layer 34B was 20 µm or less.

Accordingly, in the secondary battery of an embodiment, it was confirmed that the cycle characteristics were also improved when the composition of the solvent was changed.

Examples 5-1 to 5-3

A procedure was performed in the same manner as that of Example 1-2, except that the volume density and the capacity of the anode active material layer 34B were 1.40 g/cm$^3$ and 650 mAh (Example 5-1), 1.60 g/cm$^3$ and 720 mAh (Example 5-2), or 1.95 g/cm$^3$ and 830 mAh (Example 5-3).

Comparative Examples 5-1 to 5-3

A procedure was performed in the same manner as that of Examples 5-1 to 5-3, except that the compound of Chemical formula 3 was not added to the solvent.

When the cycle characteristics of the secondary batteries of Examples 5-1 to 5-3 and Comparative examples 5-1 to 5-3 were examined, the results shown in Table 5 were obtained.

TABLE 5

Thickness of the anode active material layer: 30 µm

| | Anode active material layer Volume density (g/cm$^3$) | Electrolyte salt | Solvent Type | Sulfone compound Type | Weight % | Capacity (mAh) | Discharge capacity retention ratio (%) | Increase in retention ratio |
|---|---|---|---|---|---|---|---|---|
| Example 5-1 | 1.40 | LiPF$_6$ 1 mol/kg | EC + DEC + FEC | Chemical formula 3 | 0.5 | 650 | 89 | +2 |
| Example 5-2 | 1.60 | | | | | 720 | 84 | +7 |
| Example 1-2 | 1.85 | | | | | 800 | 81 | +16 |
| Example 5-3 | 1.95 | | | | | 830 | 75 | +20 |
| Comparative example 5-1 | 1.40 | LiPF$_6$ 1 mol/kg | EC + DEC + FEC | — | — | 650 | 87 | — |
| Comparative example 5-2 | 1.60 | | | | | 720 | 77 | — |
| Comparative example 1-3 | 1.85 | | | | | 800 | 65 | — |
| Comparative example 5-3 | 1.95 | | | | | 830 | 55 | — |

As shown in Table 5, results similar to the results of Table 1 were also obtained when the volume density of the anode active material layer 34B was changed. That is, in Examples 5-1 to 5-3 in which the solvent contained the compound of Chemical formula 3, the discharge capacity retention ratio was higher than that of Comparative examples 5-1 to 5-3 in which the solvent did not contain the compound of Chemical formula 3.

Focusing attention on the volume density of the anode active material layer 34B, in Examples 1-2 and 5-1 to 5-3, there was a tendency that as the volume density became higher, the discharge capacity retention ratio became lower. If the volume density was in the range from 1.40 g/cm$^3$ to 1.95 g/cm$^3$, the discharge capacity retention ratio was 70% or more. In that case, if the volume density was in the range from 1.60 g/cm$^3$ to 1.95 g/cm$^3$, the increase in retention ratio was extremely large, and if the volume density was in the range from 1.60 g/cm$^3$ to 1.85 g/cm$^3$, both the discharge capacity retention ratio and the increase in retention ratio were sufficiently large.

Accordingly, in the secondary battery of an embodiment, it was confirmed that the cycle characteristics were also improved in the case that the volume density of the anode active material layer was changed. In particular, it was also confirmed that if the volume density was in the range from 1.40 g/cm$^3$ to 1.95 g/cm$^3$, favorable cycle characteristics were obtained, and if the volume density was in the range from 1.60 g/cm$^3$ to 1.95 g/cm$^3$, or more particularly if the volume density was in the range from 1.60 g/cm$^3$ to 1.85 g/cm$^3$, the cycle characteristics were further improved.

Example 6

A procedure was performed in the same manner as that of Example 1-5, except that lithium tetrafluoroborate (LiBF$_4$) was added as an electrolyte salt, and the concentrations of LiPF$_6$ and LiBF$_4$ in the electrolytic solution were respectively 0.9 mol/kg and 0.1 mol/kg.

Comparative Example 6

A procedure was performed in the same manner as that of Comparative example 1-4, except that LiBF$_4$ was added as an electrolyte salt as in Example 6.

When the cycle characteristics and the load characteristics of the secondary batteries of Example 6 and Comparative example 6 were examined, the results shown in Table 6 were obtained.

In examining the load characteristics, charge was performed under conditions similar to those in the case of examining the cycle characteristics. After that, discharge was performed at the constant current of 3 C until the final voltage of 3.0 V to measure the discharge capacity (3 C discharge capacity). "3 C" means a current value with which the theoretical capacity is completely discharged in 20 minutes. When the capacity of the secondary battery is 800 mAh, 3 C is 2400 mA.

As shown in Table 6, results similar to the results of Table 1 were also obtained when the electrolyte salt contained LiBF$_4$. That is, in Example 6 in which the solvent contained the compound of Chemical formula 3, the discharge capacity retention ratio was higher than that of Comparative example 6 in which the solvent did not contain the compound of Chemical formula 3. Further, in Example 6 in which the electrolyte salt contained LiBF$_4$, the discharge capacity retention ratio was higher than that of Example 1-5 in which the electrolyte salt did not contain LiBF$_4$, and it is needless to say that such a discharge capacity retention ratio was higher than that of Comparative example 1-4

In this case, in Example 6, the 3 C discharge capacity was higher than that of Comparative examples 1-4 and 6, and the 3 C discharge capacity was higher than that of Example 1-5.

Accordingly, in the secondary battery of an embodiment, it was confirmed that the cycle characteristics were further improved and the load characteristics were improved when the electrolyte salt contained LiPF$_6$ and LiBF$_4$.

As evidenced by the results of the foregoing Table 1 to Table 6, in the secondary battery of an embodiment, it was confirmed that the cycle characteristics were improved even if the thickness of the anode active material layer was increased to obtain a high capacity irrespective of the solvent composition, the electrolyte salt and the like under the condition that the anode active material layer of the anode contained the carbon material and had a thickness of 30 μm or more and the solvent of the electrolytic solution contained at least one of the sulfone compounds shown in Chemical formula 1 and Chemical formula 2.

No result is herein shown for a case that the solvent contains a plurality of sulfone compounds and the anode active material layer contains a plurality of carbon materials. However, it is evident that the cycle characteristics are improved when the sulfone compound or the carbon material is used singly, and there is no particular reason for that the cycle characteristics are lowered when the plurality thereof are used by mixture. That is, it is evident that similar result is also obtained when the plurality of sulfone compounds or the plurality of carbon materials are used.

Additional experimental data is provided below in Tables 7-1 to 7-4 and 8-1 to 8-4.

TABLE 6

Volume density of the anode active material layer: 1.85 g/cm$^3$

| | Anode active material layer Thickness (μm) | Electrolyte salt | Solvent Type | Sulfone compound Type | Weight % | Discharge capacity retention ratio (%) | Increase in retention ratio | 3 C discharge capacity (mAh) |
|---|---|---|---|---|---|---|---|---|
| Example 1-5 | 40 | LiPF$_6$ 1 mol/kg | EC + DEC + FEC | Chemical formula 3 | 0.5 | 75 | +18 | 630 |
| Example 6 | | LiPF$_6$ LiBF$_4$ 0.9 mol/kg 0.1 mol/kg | | | | 77 | +19 | 700 |
| Comparative example 1-4 | 40 | LiPF$_6$ 1 mol/kg | EC + DEC + FEC | — | — | 57 | — | 600 |
| Comparative example 6 | | LiPF$_6$ LiBF$_4$ 0.9 mol/kg 0.1 mol/kg | | | | 58 | — | 640 |

TABLE 7-1

Cylindrical cell, anode: carbon

| | Lithium salts | solvent | | | | Relative Discharge Capacity [%] | | |
|---|---|---|---|---|---|---|---|---|
| | LiPF$_6$ | Kind | Kind | additive | weight % | After cycle at 60° C. | Storage at 60° C. | 3 C discharge |
| Sample | 1.0 mol/kg | EC | DMC | FEC + VC + PSAH | 5 + 1 + 0.001 | 87 | 93 | 83 |
| Sample | | EC | DMC | FEC + VC + PSAH | 5 + 1 + 0.01 | 87 | 93 | 85 |
| Sample | | EC | DMC | FEC + VC + PSAH | 5 + 1 + 0.1 | 88 | 93 | 85 |
| Sample | | EC | DMC | FEC + VC + PSAH | 5 + 1 + 0.2 | 89 | 95 | 86 |
| Sample | | EC | DMC | FEC + VC + PSAH | 5 + 1 + 0.5 | 90 | 95 | 88 |
| Sample | | EC | DMC | FEC + VC + PSAH | 5 + 1 + 1 | 93 | 95 | 90 |
| Sample | | EC | DMC | FEC + VC + PSAH | 5 + 1 + 2 | 93 | 97 | 88 |
| Sample | | EC | DMC | FEC + VC + PSAH | 1 + 1 + 1 | 90 | 93 | 88 |
| Sample | | EC | DMC | FEC + VC + PSAH | 2 + 1 + 1 | 91 | 94 | 88 |
| Sample | | EC | DMC | FEC + VC + PSAH | 7 + 1 + 1 | 94 | 95 | 90 |
| Sample | | EC | DMC | FEC + VC + PSAH | 10 + 1 + 1 | 95 | 95 | 90 |
| Sample | | EC | DMC | FEC + VC + PSAH | 15 + 1 + 1 | 95 | 93 | 90 |
| Sample | | EC | DMC | FEC + VC + PSAH | 20 + 1 + 1 | 95 | 92 | 90 |
| Sample | | EC | DMC | FEC + VC + PSAH | 5 + 0.1 + 1 | 90 | 92 | 88 |
| Sample | | EC | DMC | FEC + VC + PSAH | 5 + 0.2 + 1 | 90 | 93 | 89 |
| Sample | | EC | DMC | FEC + VC + PSAH | 5 + 0.5 + 1 | 92 | 93 | 90 |
| Sample | | EC | DMC | FEC + VC + PSAH | 5 + 2 + 1 | 93 | 94 | 89 |
| Sample | | EC | DMC | FEC + VC + PSAH | 5 + 3 + 1 | 92 | 94 | 88 |
| Sample | | EC | DMC | FEC + VC + PSAH | 5 + 5 + 1 | 92 | 94 | 86 |
| Sample | | EC | DMC | t-DFEC + VC + PSAH | 5 + 1 + 1 | 93 | 95 | 90 |
| Sample | | EC | DMC | c-DFEC + VC + PSAH | 5 + 1 + 1 | 93 | 95 | 90 |

TABLE 7-2

Cylindrical cell, anode: carbon

| | Lithium salts | solvent | | | | Relative Discharge Capacity [%] | | |
|---|---|---|---|---|---|---|---|---|
| | LiPF$_6$ | Kind | Kind | additive | weight % | After 60° C. cycle | Storage at 60° C. | 3 C discharge |
| Sample | 1.0 mol/kg | EC | DMC | FEC + VC + PSAH + SCAH | 5 + 1 + 1 + 1 | 95 | 97 | 92 |
| Sample | | EC | DMC | FEC + VC + PSAH + PRS | 5 + 1 + 1 + 1 | 93 | 97 | 93 |

TABLE 7-3

Cylindrical cell, anode: carbon

| | Lithium salts | | solvent | | | | Relative Discharge Capacity [%] | | |
|---|---|---|---|---|---|---|---|---|---|
| | LiPF$_6$ | Kind | Kind | Kind | additive | weight % | After 60° C. cycle | Storage at 60° C. | 3 C discharge |
| Sample | 0.9 mol/kg | LiBF4 0.05 mol/kg | EC | DMC | FEC + VC + PSAH | 5 + 2 + 1 | 95 | 97 | 92 |
| Sample | | LiBOB 0.05 mol/kg | EC | DMC | FEC + VC + PSAH | 5 + 2 + 1 | 95 | 97 | 91 |
| Sample | | LiTFSI 0.05 mol/kg | EC | DMC | FEC + VC + PSAH | 5 + 2 + 1 | 94 | 97 | 91 |

TABLE 7-3

| | | | | | | Relative Discharge Capacity [%] | | |
|---|---|---|---|---|---|---|---|---|
| | Lithium salts | | solvent | | | After | Storage at | 3 C |
| | LiPF$_6$ | Kind | Kind | additive | weight % | 60° C. cycle | 60° C. | discharge |
| Sample | 1.0 mol/kg | EC | DMC | 無し | 0 | 81 | 75 | 80 |
| Sample | | EC | DMC | FEC | 5 | 84 | 80 | 80 |
| Sample | | EC | DMC | VC | 1 | 83 | 82 | 78 |
| Sample | | EC | DMC | PSAH | 1 | 88 | 92 | 82 |
| Sample | | EC | DMC | FEC + PSAH | 5 + 1 | 90 | 92 | 82 |
| Sample | | EC | DMC | VC + PSAH | 1 + 1 | 89 | 93 | 82 |
| Sample | | EC | DMC | FEC + VC | 5 + 1 | 85 | 83 | 78 |

Cylindrical cell, anode: carbon

TABLE 8-1

Cylindrical cell, anode: Si

| | | | | | | Relative Discharge Capacity [%] | | |
|---|---|---|---|---|---|---|---|---|
| | Lithium salts | | solvent | | | After cycle at | Storage at | 3 C |
| | LiPF$_6$ | Kind | Kind | additive | weight % | 60° C. | 60° C. | discharge |
| Sample | 1.0 mol/kg | EC | DMC | FEC + VC + PSAH | 5 + 2 + 0.001 | 64 | 91 | 86 |
| Sample | | EC | DMC | FEC + VC + PSAH | 5 + 2 + 0.01 | 64 | 91 | 88 |
| Sample | | EC | DMC | FEC + VC + PSAH | 5 + 2 + 0.1 | 64 | 91 | 90 |
| Sample | | EC | DMC | FEC + VC + PSAH | 5 + 2 + 0.2 | 64 | 91 | 93 |
| Sample | | EC | DMC | FEC + VC + PSAH | 5 + 2 + 0.5 | 66 | 92 | 95 |
| Sample | | EC | DMC | FEC + VC + PSAH | 5 + 2 + 1 | 68 | 92 | 95 |
| Sample | | EC | DMC | FEC + VC + PSAH | 5 + 2 + 2 | 68 | 94 | 94 |
| Sample | | EC | DMC | FEC + VC + PSAH | 1 + 2 + 1 | 56 | 91 | 92 |
| Sample | | EC | DMC | FEC + VC + PSAH | 2 + 2 + 1 | 60 | 92 | 92 |
| Sample | | EC | DMC | FEC + VC + PSAH | 7 + 2 + 1 | 64 | 92 | 95 |
| Sample | | EC | DMC | FEC + VC + PSAH | 10 + 2 + 1 | 72 | 92 | 95 |
| Sample | | EC | DMC | FEC + VC + PSAH | 15 + 2 + 1 | 72 | 91 | 95 |
| Sample | | EC | DMC | FEC + VC + PSAH | 20 + 2 + 1 | 72 | 90 | 95 |
| Sample | | EC | DMC | FEC + VC + PSAH | 5 + 0.1 + 1 | 62 | 90 | 94 |
| Sample | | EC | DMC | FEC + VC + PSAH | 5 + 0.2 + 1 | 63 | 90 | 94 |
| Sample | | EC | DMC | FEC + VC + PSAH | 5 + 0.5 + 1 | 65 | 91 | 95 |
| Sample | | EC | DMC | FEC + VC + PSAH | 5 + 1 + 1 | 68 | 94 | 95 |
| Sample | | EC | DMC | FEC + VC + PSAH | 5 + 3 + 1 | 70 | 94 | 94 |
| Sample | | EC | DMC | FEC + VC + PSAH | 5 + 5 + 1 | 72 | 94 | 93 |
| Sample | | EC | DMC | t-DFEC + VC + PSAH | 5 + 2 + 1 | 78 | 92 | 95 |
| Sample | | EC | DMC | c-DFEC + VC + PSAH | 5 + 2 + 1 | 78 | 92 | 95 |

TABLE 8-2

Cylindrical cell, anode: Si

| | Lithium salts | | solvent | | | | Relative Discharge Capacity [%] | | |
|---|---|---|---|---|---|---|---|---|---|
| | LiPF$_6$ | Kind | | Kind | additive | weight % | After cycle at 60° C. | Storage at 60° C. | 3 C discharge |
| Sample | 0.9 mol/kg | LiBF4 0.05 mol/kg | | EC | DMC FEC + VC + PSAH | 5 + 2 + 1 | 69 | 97 | 96 |
| Sample | | LiBOB 0.05 mol/kg | | EC | DMC FEC + VC + PSAH | 5 + 2 + 1 | 70 | 97 | 96 |
| Sample | | LiTFSI 0.05 mol/kg | | EC | DMC FEC + VC + PSAH | 5 + 2 + 1 | 68 | 97 | 96 |

TABLE 8-3

Cylindrical cell, anode: Si

| | Lithium salts | solvent | | | | Relative Discharge Capacity [%] | | |
|---|---|---|---|---|---|---|---|---|
| | LiPF$_6$ | Kind | Kind | additive | weight % | After cycle at 60° C. | Storage at 60° C. | 3 C discharge |
| Sample | 1.0 mol/kg | EC | DMC | FEC + VC + PSAH + SCAH | 5 + 1 + 1 + 1 | 72 | 97 | 92 |
| Sample | | EC | DMC | FEC + VC + PSAH + PRS | 5 + 1 + 1 + 1 | 68 | 97 | 93 |

TABLE 8-4

Cylindrical cell, anode: Si

| | Lithium salts | solvent | | | | Relative Discharge Capacity [%] | | |
|---|---|---|---|---|---|---|---|---|
| | LiPF$_6$ | Kind | Kind | additive | weight % | After cycle at 60° C. | Storage at 60° C. | 3 C discharge |
| Sample | 1.0 mol/kg | EC | DMC | nothing | 0 | 40 | 75 | 82 |
| Sample | | EC | DMC | FEC | 5 | 60 | 79 | 82 |
| Sample | | EC | DMC | VC | 2 | 55 | 80 | 78 |
| Sample | | EC | DMC | PSAH | 1 | 45 | 88 | 84 |
| Sample | | EC | DMC | FEC + PSAH | 5 + 1 | 62 | 90 | 84 |
| Sample | | EC | DMC | VC + PSAH | 2 + 1 | 60 | 90 | 84 |
| Sample | | EC | DMC | FEC + VC | 5 + 2 | 62 | 81 | 78 |

The present application has been described with reference to the embodiments and the examples. However, the present application is not limited to the aspects described in the foregoing embodiments and the foregoing examples, and various modifications may be made. For example, in the foregoing embodiments and the foregoing examples, the descriptions have been given of the case using the electrolytic solution or the gel electrolyte in which the electrolytic solution is held by the polymer compound as an electrolyte of the battery. However, other type of electrolyte may be used. As other type of electrolyte, for example, a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte or the like is cited.

Further, in the foregoing embodiments and the foregoing examples, the descriptions have been given of the lithium ion secondary battery in which the anode capacity is expressed based on insertion and extraction of lithium as a battery type. However, the battery of an embodiment is not limited thereto. The present application is similarly applicable to a secondary battery in which the anode capacity includes the capacity based on insertion and extraction of lithium and the capacity based on precipitation and dissolution of lithium, and the anode capacity is expressed as the sum of these capacities, by setting the charge capacity of the anode active material capable of inserting and extracting lithium to a smaller value than that of the charge capacity of the cathode.

Further, in the foregoing embodiments or the foregoing examples, the descriptions have been given with the specific examples of the cylindrical type and laminated film type as a battery structure of the battery, and with the specific example of the spirally wound structure as a structure of the battery element. However, the present application is similarly applicable to a battery having other battery structure such as a coin type battery, a button type battery, and a square type battery, or a battery in which the battery element has a lamination structure. The battery of the present application is similarly applicable to other type of battery such as a primary battery in addition to the secondary battery.

Further, in the foregoing embodiments and the foregoing examples, the description has been given of the case using lithium as an electrode reactant. However, other Group 1A element such as sodium (Na) and potassium (K), a Group 2A element such as magnesium and calcium (Ca), or other light metal such as aluminum may be used. In these cases, the anode material described in the foregoing embodiments may be used as an anode active material as well.

Further, in the foregoing embodiments and the foregoing examples, for the thickness of the anode active material layer, the numerical value range thereof derived from the results of the examples has been described as the appropriate range. However, such a description does not totally eliminate the possibility that the thickness may be out of the foregoing range. That is, the foregoing appropriate range is the range particularly preferable for obtaining the effects of the present application. Therefore, as long as effects of the present application are obtainable, the thickness may be out of the foregoing range in some degrees. The same is applied to the content of the sulfone compound in the solvent, the volume density of the anode active material layer and the like.

It should be understood that various changes and modifications to the presently preferred embodiments described herein will be apparent to those skilled in the art. Such changes and modifications can be made without departing from the spirit and scope of the present subject matter and The invention is claimed as follows:

1. A battery comprising:
   a cathode;
   an anode; and
   an electrolytic solution,
   wherein the anode comprises an anode active material layer provided on at least one side of an anode current collector, and the anode active material layer comprises an anode active material consisting of a carbon material or a plurality of carbon materials and has a thickness of 30 μm to 100 μm on a single side of the anode current collector,
   wherein the electrolytic solution contains a solvent and an electrolyte salt,
   wherein the solvent contains a sulfone compound selected from the group consisting of sulfone compounds shown in Chemical formula 1 and Chemical formula 2:

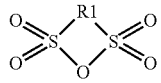

Chemical formula 1 where R1 represents $C_mH_{2m-n}X_n$, and X represents a halogen; m represents one of integer numbers of from 2 to 4; and n represents one of integer numbers of from 0 to 2m;

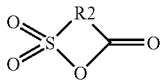

Chemical formula 2 where R2 represents $C_jH_{2j-k}X_k$, and X represents a halogen; j represents one of integer numbers of from 2 to 4; and k represents one of integer numbers of from 0 to 2j, and
wherein the solvent contains a cyclic ester carbonate having a halogen shown in Chemical formula 6:

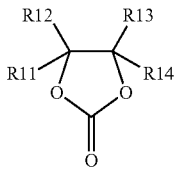

Chemical formula 6 where R11, R12, R13, and R14 represent a hydrogen group, a halogen group, an alkyl group, or an alkyl halide group; and at least one thereof is the halogen group or the alkyl halide group,
wherein the thickness of the anode active material layer ranges from 30 μm to 60 μm, and
wherein the battery includes a gel electrolyte that includes the electrolytic solution and a polymer compound that holds the electrolytic solution.

2. The battery according to claim 1, wherein the sulfone compound is a compound selected from the group consisting of sulfone compounds shown in Chemical formula 3 and Chemical formula 4:

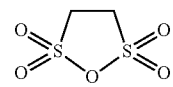

Chemical formula 3

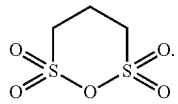

Chemical formula 4

3. The battery according to claim 1, wherein the sulfone compound is a compound shown in Chemical formula 5:

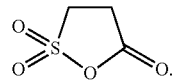

Chemical formula 5

4. The battery according to claim 1, wherein a content of sulfone compounds shown in Chemical formula 1 and Chemical formula 2 in the solvent is in the range from 0.05 wt % to 2 wt %.

5. The battery according to claim 1, wherein the carbon material is graphite.

6. The battery according to claim 5, wherein the graphite is an artificial graphite.

7. The battery according to claim 1, wherein the anode active material layer has a volume density in the range from 1.60 g/cm³ to 1.95 g/cm³.

8. The battery according to claim 1, wherein the cyclic ester carbonate having a halogen shown in Chemical formula 6 is at least one of 4-fluoro-1,3-dioxolane-2-one and 4,5-difluoro-1,3-dioxolane-2-one.

9. The battery according to claim 1, wherein the electrolyte salt contains lithium hexafluorophosphate ($LiPF_6$) and lithium tetrafluoroborate ($LiBF_4$).

10. The battery according to claim 1, wherein the solvent further contains a cyclic vinylene carbonate or derivatives thereof.

11. The battery according to claim 10, wherein the cyclic vinylene carbonate is vinylene carbonate.

12. An electronic device comprising:
    a battery including a cathode, an anode, and an electrolytic solution,
    wherein the anode comprises an anode active material layer provided on at least one side of an anode current collector, and the anode active material layer comprises an anode active material consisting of a carbon material or a plurality of carbon materials and has a thickness of 30 μm to 100 μm on a single side of the anode current collector,
    wherein the electrolytic solution contains a solvent and an electrolyte salt, and the solvent contains a sulfone compound selected from the group consisting of sulfone compounds shown in Chemical formula 1 and Chemical formula 2:

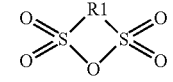

Chemical formula 1 where R1 represents $C_mH_{2m-n}X_n$, and X represents a halogen; m represents one of integer numbers of from 2 to 4; and n represents one of integer numbers of from 0 to 2m;

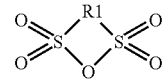

Chemical formula 1 where R1 represents $C_mH_{2m-n}X_n$, and X represents a halogen; m represents one of integer numbers of from 2 to 4; and n represents one of integer numbers of from 0 to 2m;

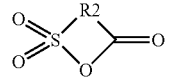

Chemical formula 2 where R2 represents $C_jH_{2j-k}X_k$, and X represents a halogen; j represents one of integer numbers of from 2 to 4; and k; represents one of integer numbers of from 0 to 2j, and wherein the solvent contains a cyclic ester carbonate having a halogen shown in Chemical formula 6:

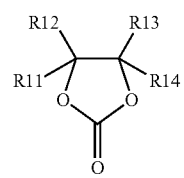

Chemical formula 6 where R11, R12, R13, and R14 represent a hydrogen group, a halogen group, an alkyl group, or an alkyl halide group; and at least one thereof is the halogen group or the alkyl halide group, wherein the thickness of the anode active material layer ranges from 30 μm to 60 μm, and wherein the battery includes a package member that includes a film, and wherein the battery includes a gel electrolyte that includes the electrolytic solution and a polymer compound that holds the electrolytic solution.

17. The battery according to claim 16, wherein the film includes a laminated film.

18. The battery according to claim 17, wherein the laminated film includes aluminum.

19. The battery according to claim 16, wherein the sulfone compound is a compound selected from the group consisting of sulfone compounds shown in Chemical formula 3 and Chemical formula 4:

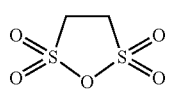

Chemical formula 3

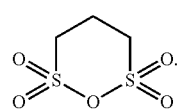

Chemical formula 4

20. The battery according to claim 16, wherein the sulfone compound is a compound shown in Chemical formula 5:

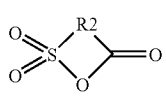

Chemical formula 2 where R2 represents $C_jH_{2j-k}X_k$, and X represents a halogen; j represents one of integer numbers of from 2 to 4; and k represents one of integer numbers of from 0 to 2j, and, wherein the solvent contains a cyclic ester carbonate having a halogen shown in Chemical formula 6:

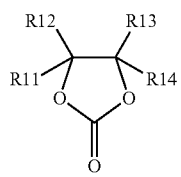

Chemical formula 6 where R11, R12, R13, and R14 represent a hydrogen group, a halogen group, an alkyl group, or an alkyl halide group; and at least one thereof is the halogen group or the alkyl halide group, wherein the thickness of the anode active material layer ranges from 30 μm to 60 μm, and wherein the battery includes a gel electrolyte that includes the electrolytic solution and a polymer compound that holds the electrolytic solution.

13. The battery according to claim 1, wherein the cathode comprises a cathode active material and the anode active material layer comprises an anode active material, and wherein a charge capacity of the anode active material is greater than a charge capacity of the cathode active material.

14. The battery according to claim 1, wherein the cathode comprises a cathode active material layer provided on at least one side of a cathode current collector, and the cathode active material layer has a thickness of 30 μm to 100 μm on a single side of the cathode current collector.

15. The battery according to claim 1, wherein the cathode comprises a cathode active material layer provided on at least one side of a cathode current collector, and the cathode active material layer has a same thickness as that of the anode active material layer.

16. A battery comprising:

a cathode;

an anode; and an electrolytic solution, wherein the anode comprises an anode active material layer provided on at least one side of an anode current collector, and the anode active material layer comprises an anode active material consisting of a carbon material or a plurality of carbon materials and has a thickness of 30 μm to 100 μm on a single side of the anode current collector, wherein the electrolytic solution contains a solvent and an electrolyte salt, wherein the solvent contains a sulfone compound selected from the group consisting of sulfone compounds shown in Chemical formula 1 and Chemical formula 2:

Chemical formula 5

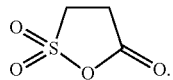

(5)

21. The battery according to claim 16, wherein a content of sulfone compounds shown in Chemical formula 1 and Chemical formula 2 in the solvent is in the range from 0.05 wt % to 2 wt %.

22. The battery according to claim 16, wherein the carbon material is graphite.

23. The battery according to claim 22, wherein the graphite is an artificial graphite.

24. The battery according to claim 16, wherein the cyclic ester carbonate having a halogen shown in Chemical formula 6 is at least one of 4-fluoro-1,3-dioxolane-2-one and 4,5-difluoro-1,3-dioxolane-2-one.

25. The battery according to claim 16, wherein the electrolyte salt contains lithium hexafluorophosphate ($LiPF_6$) and lithium tetrafluoroborate ($LiBF_4$).

26. The battery according to claim 16, wherein the solvent further contains a cyclic vinylene carbonate or derivatives thereof.

27. The battery according to claim 26, wherein the cyclic vinylene carbonate is vinylene carbonate.

28. An electronic device comprising a battery according to claim 16.

* * * * *